(12) United States Patent
García Pérez et al.

(10) Patent No.: US 12,443,871 B2
(45) Date of Patent: Oct. 14, 2025

(54) SCALABLE TENSOR-NETWORK-BASED NOISE MITIGATION FOR NEAR-TERM QUANTUM COMPUTING

(71) Applicant: Algorithmiq Oy, Helsinki (FI)

(72) Inventors: Guillermo García Pérez, Helsinki (FI); Sergei Filippov, Helsinki (FI)

(73) Assignee: ALGORITHMIQ OY, Helsinki (FI)

( * ) Notice: Subject to any disclaimer, the term of this patent is extended or adjusted under 35 U.S.C. 154(b) by 0 days.

(21) Appl. No.: 18/734,466

(22) Filed: Jun. 5, 2024

(65) Prior Publication Data
US 2024/0412091 A1 Dec. 12, 2024

Related U.S. Application Data

(63) Continuation of application No. PCT/EP2023/065131, filed on Jun. 6, 2023.

(51) Int. Cl.
G06N 10/40 (2022.01)
G06N 3/042 (2023.01)

(52) U.S. Cl.
CPC ............. *G06N 10/40* (2022.01); *G06N 3/042* (2023.01)

(58) Field of Classification Search
CPC ......... G06N 10/40; G06N 3/042; G06N 10/70
See application file for complete search history.

(56) References Cited

U.S. PATENT DOCUMENTS

2022/0092460 A1* 3/2022 Piveteau ............... G06N 10/00

OTHER PUBLICATIONS

Filippov et al. "Matrix product channel: Variationally optimized quantum tensor network to mitigate noise and reduce errors for the variational quantum eigensolver", Dec. 20, 2022, arXiv:2212.10225v1, pp. 1-11. (Year: 2022).*
J. Preskill, "Fault-tolerant quantum computation," in Introduction to Quantum Computation and Information (1998) pp. 213-269.
D. Gottesman, "Opportunities and challenges in fault-tolerant quantum computation" (2022), arXiv:2210.15844 [quant-ph], 24 pages.
Y. Suzuki, et al., "Quantum error mitigation as a universal error reduction technique: Applications from the nisq to the fault-tolerant quantum computing eras," PRX Quantum 3, 010345 (2022), 33 pages.

(Continued)

*Primary Examiner* — Brent Johnston Hoover
(74) *Attorney, Agent, or Firm* — Rothwell, Figg, Ernst & Manbeck, P.C.

(57) ABSTRACT

In one aspect, there is provided a noise mitigation method for an execution of a quantum circuit by a quantum processor. In another aspect, there is provided a computing system comprising a quantum processor and a classical computer, the computing system being configured to carry out the method. In another aspect, there is a computer program product including instructions which, when the program is carried out by a computer system comprising a classical computer and a quantum processor, cause the computer system to carry out the method. In another aspect, there is provided a computer program product including instructions which, when the program is carried out by a classical computer, cause the classical computer to carry out the tensor network contractions according to the method.

23 Claims, 10 Drawing Sheets

(56) References Cited

OTHER PUBLICATIONS

F. D. Malone, et al., "Towards the simulation of large scale protein-ligand interactions on NISQ-era quantum computers," Chemical Science 13, 3094 (2022), 16 pages.
J. J. M. Kirsopp, et al., "Quantum computational quantification of protein-ligand interactions," International Journal of Quantum Chemistry 122, e26975 (2021), 12 pages.
A. Robert, et al., "Resource-efficient quantum algorithm for protein folding," npj Quantum Information 7, 1 (2021), 5 pages.
J. D. Guimarães, et al., "Noise-assisted digital quantum simulation of open systems," arXiv preprint arXiv:2302.14592 (2023), 19 pages.
K. Temme, et al., "Error mitigation for short-depth quantum circuits," Phys. Rev. Lett. 119, 180509 (2017), 15 pages.
Y. Li and S. C. Benjamin, "Efficient variational quantum simulator incorporating active error minimisation," Phys. Rev. X 7, 021050 (2017), 14 pages.
S. Endo, et al., "Practical quantum error mitigation for near-future applications," Phys. Rev. X 8, 031027 (2018), 20 pages.
E. Van Den Berg, et al., "Probabilistic error cancellation with sparse pauli-lindblad models on noisy quantum processors," Nature Physics, 1 (2022), 29 pages.
Y. Guo and S. Yang, "Quantum error mitigation via matrix product operators," PRX Quantum 3, 040313 (2022), 13 pages.
G. García-Pérez, et al., "Learning to measure: Adaptive informationally complete generalized measurements for quantum algorithms," PRX Quantum 2, 040342 (2021), 17 pages.
H.-Y. Huang, et al., "Predicting many properties of a quantum system from very few measurements," Nature Physics 16, 1050 (2020), 9 pages.
C. Hadfield, et al., "Measurements of quantum hamiltonians with locally-biased classical shadows," Communications in Mathematical Physics 391, 951 (2022), 17 pages.
H.-Y. Huang, et al., "Efficient estimation of Pauli observables by derandomization," Physical Review Letters 127, 030503 (2021), 12 pages.
J. I. Cirac, et al., "Matrix product states and projected entangled pair states: Concepts, symmetries, theorems," Rev. Nod. Phys. 93, 015003 (2021), 72 pages.
A. Miller, et al., "The bonsai algorithm: grow your own fermiontoqubit mapping," arXiv preprint ar Xiv:2212.09731 (2022), 17 pages.
A. H. Werner, et al., "Positive tensor network approach for simulating open quantum many-body Systems," Phys. Rev. Lett. 116, 237201 (2016), 7 pages.
G. Torlai, et al., "Quantum process tomorgraphy with unsupervised learning and tensor networks," Nature Communications 14, 2858 (2023), 10 pages.
S. Srinivasan, et al., "Towards a trace-preserving tensor network representation of quantum channels," in Second Workshop on Quantum Tensor Networks in Machine Learning, 35th Conference on Neural Information Processing Systems (NeurIPS 2021) (2021), 10 pages.
S. Filippov, et al., "Matrix product channel: Variationally optimized quantum tensor network to mitigate noise and reduce errors for the variational quantum eigensolver," arXiv:2212. 10225v (2022), 11 pages.
D. Perez-García, et al., "Matrix product state representations," Quantum Information and Computation 7, 401 (2007), 28 pages.
F. Verstraete, et al., "Matrix product states, projected entangled pair states, and variational renormalization group methods for quantum spin systems," Advances in Physics 57, 143 (2008), 83 pages.
U. Schollwöck, "The density-matrix renormalization group in the age of matrix product states," Annals of Physics 326, 96 (2011), 118 pages.
C. Hubig, et al., "Generic construction of efficient matrix product operators," Physical Review B 95, 035129 (2017), 13 pages.
S. Montangero, et al., Introduction to tensor network methods (Springer, 2018), 172 pages.
M. R. Geller and Z. Zhou, "Efficient error models for fault-tolerant architectures and the pauli twirling approximation," Phys. Rev. A 88. 012314 (2013), 8 pages.
J. J. Wallman and J. Emerson, "Noise tailoring for scalable quantum computation via randomized compiling," Phys. Rev.A 94, 052325 (2016), 10 pages.
S. Boyd and L. Vandenberghe, Introduction to applied linear algebra: vectors, matrices, and least squares (Cambridge university press, 2018), 473 pages.
J. Gray, "Quimb: A python package for quantum information and many-body calculations," Journal of Open Source Software 3. 819 (2018), 3 pages.
J. Gray and S. Kourtis, "Hyper-optimized tensor network contraction," Quantum 5, 410 (2021), 22 pages.
M. A. Nielsen and I. L. Chuang, Quantum Computation and Quantum Information (Cambridge University Press, 2010), 710 pages.
E. Nielsen, et al., "Gate set tomography," Quantum 5, 557 (2021), 59 pages.
F. Verstraete and J. I. Cirac, "Matrix product states represent ground states faithfully," Phys. Rev. B 73, 091123 (2006), 8 pages.
D. Gottesman, "The heisenberg representation of quantum computers," arXiv preprint quant-ph/9807006 (1998), 20 pages.
S. Aaronson and D. Gottesman, "Improved simulation of stabilizer circuits," Phys. Rev. A 70. 052328 (2001), 15 pages.
S. Anders and H. J. Briegel, "Fast simulation of stabilizer circuits using a graph-state representation," Phys. Rev. A 73, 022331 (2006), 9 pages.
C. Gidney, "Stim: a fast stabilizer circuit simulator," Quantum 5, 497 (2021), 26 pages.
A. Peruzzo, et al., "A variational eigenvalue solver on a photonic quantum processor," Nature Communications 5. 1 (2014), 7 pages.
J. R. McClean, et al., "The theory of variational hybrid quantumclassical algorithms," New Journal of Physics 18. 023023 (2015), 20 pages.
M. L. (https://mathoverflow.net/users/143/michael lugo), "Sum of 'the first k' binomial coefficients for fixed N," MathOverflow (2017), https://mathoverflow.net/q/17236 (version: Oct. 1, 2017), https://mathoverflow.net/4/17236, 13 pages.
International Search Report and Written Opinion for PCT/EP2023/065131 dated Jan. 18, 2024, 16 pages.
S. Filippov, et al., "Matrix product channel: Variationally optimized quantum tensor network to mitigate noise and reduce errors for the variational quantum eigensolver," arxiv.org, Cornell University Library, 201 OLIN Library Cornell University Ithaca, NY, arXiv. 2212.10225v1, Dec. 20, 2022, 11 pages.
G. Garcia-Perez, et al., "Virtual linear map algorithm for classical boost in near-term quantum computing," arxiv.org, Cornell University Library, 201 OLIN Library Cornell University Ithaca, NY, arXiv.2207.01360v1, Jul. 4, 2022, 11 pages.
Y. Guo, et al., "Quantum error mitigation via matrix product operators," arxiv.org, Cornell University Library, 201 OLIN Library Cornell University Ithaca, NY, arXiv:2201.00752v4, Aug. 7, 2022, 12 pages.

* cited by examiner

SCALABLE TENSOR-NETWORK-BASED NOISE MITIGATION FOR NEAR-TERM QUANTUM COMPUTING

CROSS REFERENCE TO RELATED APPLICATION(S)

This application is continuation of International Patent Application No. PCT/EP2023/065131, filed Jun. 6, 2023, the disclosure of which is incorporated herein by reference in its entirety.

TECHNICAL FIELD

Aspects of the present disclosure relate to measuring the output of a noisy quantum computer in the informationally complete way to open a possibility to perform the noise mitigation entirely in the classical postprocessing of measurement outcomes. A scalable tensor network method is provided to construct the noise mitigation map and correct the noise-induced error in estimations of physical observables. The measurement overhead is shown to be lower than in the hardware-based error mitigation methods.

BACKGROUND

All roadmaps toward practical quantum computing focus on finding ways to suppress errors and increase the number of logical qubits available. Whereas the long-term goal is to achieve the fault-tolerant quantum computing by implementing qubit-demanding error-correcting codes and diminishing the noise below a certain threshold, the near-term computing uses all physical qubits as logical ones and significantly relies on the noise mitigation techniques compensating the detrimental noise effects in medium-depth quantum circuits. The latter approach attracts increasing attention in view of prospects for advantageous quantum simulations of molecules and binding affinities between chemical compounds as well as complex quantum dynamics. Some noise mitigation strategies are agnostic to the nature of the noise, thus providing universality. However, knowledge of the noise model generally makes it possible to cancel errors in a more efficient way. A prominent algorithm in this regard is the probabilistic error cancellation (PEC) that represents a noise-free circuit as a quasi-probability distribution of the randomized noisy ones at the expense of the measurement overhead (which quantitatively shows the increase in the measurement outcomes needed to get the same precision in estimation of observables). Another recently proposed approach finds the approximate noise inversion and simulates it via single-qubit gates. This approach has opened a discussion of how tensor networks could be used to mitigate noise but they were rather employed as an auxiliary tool to find the extra gates implemented in hardware. A unifying point of the previous studies is that the noise mitigation is achieved by modifying the actual hardware circuits.

SUMMARY

Using the informationally complete measurements at the output of the quantum processing unit, one gets more flexibility in estimating different observables even if the number of measurement outcomes is much less than what is needed for the state tomography. This takes place because the outcomes of informationally complete measurements can be readily converted into an estimate of the system density operator. The crucial point is that the number of measurement outcomes needed to estimate a typical physical observable is much less than what is needed for the conventional state tomography. In this regard, the term "informational completeness" should not be confused with the number of statistical samples, i.e., the measurement outcomes. This line of reasoning is aligned with the approximate reconstruction of a quantum state by using its classical shadows.

Importantly, the informationally complete measurements give a possibility to shift the noise mitigation protocol entirely to the classical postprocessing of measurement outcomes. Such a relocation of error mitigation to the post-proccesing stage is beneficial because the noise inversion map is not completely positive and therefore cannot be directly implemented in hardware (hence, the quasiprobability interpretation has been previously utilized) but this map can be implemented in silico. Shifting error mitigation to the postprocessing stage also enables one to use the full functionality of tensor network methods that are known to be scalable and well developed to increase the efficacy of classical simulations of quantum systems. Truncating the least contributing bonds in the canonical form of a tensor network makes it possible to maintain a reasonable level of computational complexity and monitor the truncation precision. Aspects of the present disclosure provide a full description of the efficient tensor-network-based (TNB) algorithm capable to mitigate noise (originating from the quantum hardware) at the postprocessing stage.

As all other noise mitigation strategies, one side effect is in the form of the measurement overhead (needed to keep precision while estimating the desired observable). One advantage of the proposed algorithm is that the associated measurement overhead is less than that for the PEC. For typical observables there is the square root advantage in the measurement overhead and, consequently, the runtime. For observables with a low Pauli weight theadvantage is much more prominent.

According to a first aspect, there is provided a noise mitigation method for an execution of a quantum circuit by a quantum processor. Said quantum circuit may be operating on a state space of N qudits that are quantum mechanical d-level systems, $d \geq 2$. Preferably, the N qudits are N qubits, i.e., $d=2$. An initial state of said N qudits may be described by a density operator $\rho_{in}$. The initial state may be transformed to a final state with density operator $\rho_{fin}$ by an application of a unitary operation $\mathcal{U}$ U on the N qudits, $\mathcal{U}(\rho_{in})=\rho_{fin}$. A quantum measurement may be applied to the final state, said quantum measurement being described by an informationally complete Positive Operator Valued Measure represented by M effects $\Pi_{m(k)}$, $k=1, \ldots, M$, the effect $\Pi_{m(k)}$ being associated with a measurement outcome m(k). Said method may comprise one or all of the following steps:

establishing a model of the noisy execution of the quantum circuit by the quantum processor, said model being representative of the noisy execution of the unitary operation $\mathcal{U}$ by the quantum processor which results in a noisy final state $\rho_{fin}^{noisy}$, said model being represented by a quantum channel $\varepsilon$, wherein the density operator $\varepsilon(\rho_{in})$ is at least an approximation of $\rho_{fin}^{noisy}$;

executing said quantum circuit $S \geq 1$ times by said quantum processor to thereby obtain a set of measurement outcomes $m(k^{(s)})$, $s=1, \ldots, S$, wherein $m(k^{(s)})$ is the measurement outcome for the s-th execution of the quantum circuit;

deriving a quasi-state tensor network representation of a quasi-state $$\rho_s = \frac{1}{S} \sum_{s=1}^{S} D_{m(k^{(s)})}$$

which is an approximation of the density operator of the noisy final state $\rho_{fin}^{noisy}$, wherein $m(k^{(s)})$ are the measurement outcomes of the execution of the quantum circuit and wherein $D_{m(k^{(s)})}$ is a dual of the effect $\Pi_{m(k^{(s)})}$, said quasi-state tensor network representation comprising a plurality of quasi-state tensors;

deriving an observable tensor network representation of a Hermitian operator O which is associated with an observable for the system of the N qudits, the observable tensor network representation comprising a plurality of observable tensors;

deriving a noise mitigation tensor network representation of a noise mitigation map $\mathcal{M}$, wherein the noise mitigation map $\mathcal{M}$ is a concatenation of an inverse of the quantum channel $\varepsilon$ followed by the unitary operation $\mathcal{U}$, $\mathcal{M} = \mathcal{U} \circ \varepsilon^{-1}$, the noise mitigation tensor network representation comprising a plurality of noise mitigation tensors;

providing the quasi-state tensor network representation, the observable tensor network representation and the noise mitigation tensor network representation to a classical computer;

executing, by the classical computer, a tensor network contraction algorithm to thereby calculate a value of tr[$\mathcal{M}(\rho_S)O$], said tensor network contraction algorithm including instructions for contracting a tensor network representation of tr[$\mathcal{M}(\rho_S)O$] in terms of the quasi-state tensors, the observable tensors and the noise mitigation tensors according to a predetermined contraction rule of physical and virtual indices of said tensors to thereby obtain a noise mitigated value of the expectation value tr[$O\rho_{fin}$] of the observable associated with the Hermitian operator O for the final quantum state $\rho_{fin}$ of the quantum circuit.

The quantum processor may also be denoted as quantum simulator in one non-limiting example. The quantum processor may comprise a register of N qudits, means for preparing the N qudits in the initial state described by the density operator $\rho_{in}$, means for applying the unitary operation to the N qudits and measurement means for carrying out the informationally complete Positive Operator Valued measure.

In one example, the quantum qudits may be superconducting qubits.

The unitary operation $\mathcal{U}$ is acting on the space of density operators of the N qudits.

The model of the noisy execution of the quantum circuit is represented by a quantum channel $\varepsilon$. In general, the model is such that $\varepsilon(\rho_{in})$ is at least an approximation of $\rho_{fin}^{noisy}$. For example, $\|\varepsilon(\rho_{in}) - \rho_{fin}^{noisy}\| > \varepsilon$ for some norm $\|\cdot\|$. For example, $\varepsilon > 0.01 \|\rho_{fin}^{noisy}\|$. In some examples, the quantum channel $\varepsilon$ is such that $\varepsilon(\rho_{in}) = \rho_{fin}^{noisy}$.

The model is representative of the noisy execution of the unitary operation. Additionally, the may also be representative of noise in the preparation of the initial state by the state preparation means and/or noise in execution of the quantum measurement.

The explicit form of the quantum channel $\varepsilon$ depends on the form and the amount of noise in the execution of the unitary operation by the quantum processor. The model may be established on the basis of well-thought physical considerations. E.g., it may be assumed that the noise is modelled by a depolarizing noise channel. Alternatively, the model may be established by inferring the form of the quantum channel $\varepsilon$ by measurements, e.g., by quantum process tomography.

Preferably, the model of the noisy execution of the quantum circuit is such that the tensor network representation of the noise mitigation map has a bond dimension below a threshold value.

For more than one qudit, the measurement outcomes $m(k^{(s)})$ may be multi-component expressions as explained in more detail below.

The operator O may be a Hamiltonian of a system of interest in one example. However, the embodiments disclosed herein are not limited to this, and in principle any observable may be chosen.

A tensor network representation of an operator or map may comprise a plurality of tensors and a contraction rule for theses tensors. The contraction rule specifies which indices of which tensors are contracted in which order. An N-qudits operator Q may be represented as $Q = \sum_{i_0,\ldots,i_{N-1},j_0,\ldots,j_{N-1}=0}^{N-1} q_{i_0,\ldots,i_{N-1}}^{j_0,\ldots,j_{N-1}} |i_0,\ldots,i_{N-1}\rangle \langle j_0,\ldots,j_{N-1}|$, wherein $|i_0,\ldots,i_{N-1}\rangle$ is a basis state for the Hilbert space of the N qudits and $|i_0,\ldots,i_{N-1}\rangle \langle j_0,\ldots,j_{N-1}|$ is a basis state for the space of operators associated with the Hilbert space of the N qudits. Then, the coefficient $q_{i_0,\ldots,i_{N-1}}^{j_0,\ldots,j_{N-1}}$ may be represented by a tensor network, e.g., according to $q_{i_0,\ldots,i_{N-1}}^{j_0,\ldots,j_{N-1}} = \sum_{v_0,\ldots,v_{N-1}=0}^{\chi-1} A_{i_0 j_0, v_0}^{[0]} A_{i_1 j_1, v_0, v_1}^{[1]} A_{i_2 j_2, v_1, v_2}^{[2]} \ldots A_{i_{N-2} j_{N-2}, v_{N-2}, v_{N-1}}^{[N-2]} A_{i_{N-1} j_{N-1}, v_{N-1}}^{[N-1]}$. The objects $A_{i_k j_k, v_{k-1}, v_k}^{[k]}, A_{i_p j_p, v_p}^{[p]}$ are tensors. The tensor $A_{i_k j_k, v_{k-1}, v_k}^{[k]}$ is associated with the k-th qudit. The indices $i_k, j_k$ are called physical indices, the indices $v_k$ are called virtual indices. $\chi$ is called the bond dimension. A tensor network is defined by the tensors ($A_{i_k j_k, v_{k-1}, v_k}^{[k]}$, $A_{i_p j_p, v_p}^{[p]}$ in the example) and by a contraction rule, i.e., a rule how summation over the indices is carried out. Algorithms for contracting tensor networks are known in the art.

The tensor network contraction algorithm may be related to the technical structure of the quantum computer as it involves the noise mitigation tensors. The noise mitigation tensors are derived from the noise mitigation map $\mathcal{M}$ which is linked to the hardware via the relation $\mathcal{M} = \mathcal{U} \circ \varepsilon^{-1}$ which is a concatenation of the inverse of the quantum channel $\varepsilon^{-1}$ and the unitary operation $\mathcal{U}$. The quantum channel $\varepsilon$ is a model of the noise in the hardware of the quantum processor. The unitary operation $\mathcal{U}$ is representative of the calculation that is to be carried out by the quantum processor, preferably by an application of a sequence of quantum gates as explained below. The noise mitigation map this depends on the quantum circuit and the noise present in the execution of the quantum circuit by the hardware. Calculating tr[$\mathcal{M}(\rho_S)O$] may be intractable on a classical computer due to the exponential growth of the Hilbert space. The calculation of tr[$\mathcal{M}(\rho_S)O$] becomes tractable on a classical computer via the representation of $\mathcal{M}$, $\rho_S$ and O by tensor networks. As tr[$\mathcal{M}(\rho_S)O$] = tr[$\mathcal{U} \circ \varepsilon^{-1}(\rho_S)O$].

The dual $D_{m(k)}$ of the effect $\Pi_{m(k)}$ is defined via the requirement that for every operator A in the same space of linear operators as the effects the relation $A = \sum_{m=0}^{M-1} \text{tr}[\Pi_m(k) A] D_{m(k)}$ holds. The effects may, e.g., be determined by using the classical computer and the method disclosed in L. Guerini et al, Quasiprobabilistic state-overlap estimator for NISQ devices, arxiv: 2112.11618.

The "observable tensor network representation" is the tensor network representation for the Hermitian operator O associated with the observable. The observable may be selected by a user of the metho. In the case of qubits, O is preferably an operator with low Pauli weight. Preferably, O is such that it has a tensor network representation (TNR) with a bond dimension below the threshold value.

The "quasi-state tensor network representation" is the tensor network representation for the quasi-state $\rho_S$.

The "noise mitigation tensor network representation" is the TNR for the noise mitigation map.

According to an embodiment, the application of said unitary operation $\mathcal{U}$ may be by an application of a sequence of G≥1 quantum gates $g_j$, j=1, . . . , G, each quantum gate $g_j$ being described by a gate unitary operation $u_j$. Establishing said model may comprise partitioning said sequence of quantum gates in 1≤K≤G subsequences of quantum gates, each of the K subsequences comprising 1≤K≤G quantum gates which are executed subsequently and/or simultaneously and being described by a subsequence unitary operation $\mathcal{U}_j$. Preferably each subsequence of quantum gates comprises a single quantum gate or a single layer of quantum gates. Establishing said model may comprise establishing for each subsequence of quantum gates a subsequence model representative of the noisy execution of the subsequence unitary operation $\mathcal{U}_j$ by said quantum processor and being described by a subsequence channel $\varepsilon_j$, $\varepsilon=\varepsilon_k \circ \varepsilon-1 \circ \ldots \circ \varepsilon_1$.

A quantum gate is a unitary operation acting on k<N qudits. Preferably, k≤3, more preferably k≤2. Preferably, the quantum processor is configured to execute a universal set of quantum gates.

A gate unitary operation $u_j$ is a map acting on a density operator, $u_j(\rho_{in,j})=\rho_{out,j}$ with $\rho_{in,j}$, $\rho_{out,j}$ being density operators.

If the subsequence of quantum gates comprises a single quantum gate $g_j$, then the subsequence unitary $\mathcal{U}_j = u_j$, i.e., it is the unitary operation describing the quantum gate $g_j$.

If the subsequence is a sequence of quantum gates $g_n$, $g_{n-1}, g_{n-2}$, (meaning, that first $g_{n-2}$ is applied, then $g_{n-1}$ and then $g_n$), then, $\mathcal{U}_j = u_n \circ u_{n-1} \circ u_{n-2}$.

A layer of quantum gates is a collection of quantum gates which may be executed simultaneously by the quantum processor.

Partitioning the sequence of quantum gates is such that the composition of all subsequence unitary operation is equal to the unitary operation, $\mathcal{U} = \mathcal{U}_K \circ \mathcal{U}_{K-1} \circ \ldots \circ \mathcal{U}_1$.

As a non-limiting example, partitioning the sequence $g_6$, $g_5, g_4, g_3, g_2, g_1$ (i.e., the quantum gate $g_1$ is applied first, the quantum gate $g_6$ is applied last) may be as follows: $\mathcal{U}_3 = u_6 \circ u_5 \circ u_4$, $\mathcal{U}_2 = u_3$, $\mathcal{U}_1 = u_2 \circ u_1$. Then, $\mathcal{U} = \mathcal{U}_3 \circ \mathcal{U}_2 \circ \mathcal{U}_1$.

According to an embodiment, establishing the k-th subsequence model may comprise applying quantum process tomography to the noisy implementation of the k-th subsequence of quantum gates described by the subsequence unitary operation $\mathcal{U}_k$ by the quantum processor to thereby determined the k-th subsequence channel $\varepsilon_k$. Preferably, determining of each subsequence channel comprises applying quantum process tomography to the execution of the respective quantum gate by the quantum processor.

Alternatively, the at least one subsequence channel may be determined by physical assumptions on the noise. E.g., at least one subsequence channel may be determined by assuming that the noise in the execution of the subsequence of quantum gates is depolarizing noise. Alternatively, a sparse Pauli-Lindblad model may be used to model the noise. Other options may include, for example, characterizing noise in individual gates, characterizing noise in the whole layer for N qubits where the noise is not in the sparse Pauli-Lindblad form, and/or shaping the noise into a sparse Pauli-Lindblad form by Pauli twirling.

Preferably, the model of each subsequence channel $\varepsilon_k$ is such that its inverse $\varepsilon_k^{-1}$ has a tensor network representation with a bond dimension below a threshold value.

In one embodiment, the k-th subsequence channel may be modelled as the concatenation of the k-th subsequence unitary operation $\mathcal{U}_k$ and a noise channel $\mathcal{N}_k$ representative of the noise in the execution of the k-th subsequence of quantum gates by the quantum processor according to $\varepsilon_k = \mathcal{N}_k \circ \mathcal{U}_k$ or $\varepsilon_k = \mathcal{U}_k \circ \mathcal{N}_k$.

The explicit form of the noise channel $\mathcal{N}_k$ may be determined by quantum process tomography in one example. In another example, the explicit form of the noise channel may be determined by a model selected on well-based physical considerations. E.g., the noise channel may be a depolarizing noise channel in one example.

In one embodiment, deriving said noise mitigation tensor network representation may comprise deriving a first tensor network representation of a first map $M_1 = \mathcal{U}_1 \circ \varepsilon_1^{-1}$ comprising a plurality of first tensors, deriving for the inverse $\varepsilon_k^{-1}$ of each subsequence channel $\varepsilon_k$, k≥2, an inverse channel tensor network representation comprising a plurality of inverse channel tensors, and deriving for each subsequence unitary operation $\mathcal{U}_k$, k≥2, a subsequence tensor network representation comprising a plurality of subsequence tensor. Deriving said noise mitigation tensor network representation of the noise mitigation map $\mathcal{M} = \mathcal{U}_K \circ \ldots \circ \mathcal{U}_2 \circ \mathcal{U}_1 \circ \varepsilon_1^{-1} \circ \ldots \circ \varepsilon_{K-1}^{-1} \circ \varepsilon_K^{-1}$ may be by an execution of a first $\mathcal{U}_K$ tensor network contraction algorithm by the classical computer. Said first tensor network contraction algorithm may including instructions for contracting said first tensors, inverse channel tensors and subsequence tensors according to a predetermined first contraction rule to thereby obtain the noise mitigation tensors.

In one embodiment, the first tensor network contraction algorithm may further comprise a compression of the tensors resulting from the contraction of at least some of the first tensors, the inverse channel tensors and the subsequence tensors to thereby obtain noise mitigation tensors with a bond dimension below a predetermined threshold value. Preferably, the first tensor network contraction algorithm is an iterative algorithm, wherein in each iteration a compression of the contracted tensors is carried out.

According to an embodiment, said first tensor network contraction algorithm may comprise an iterative contraction procedure following a rule for iteratively composing the noise mitigation map from the 2K maps $\mathcal{U}_k$ and $\varepsilon_k^{-1}$ in T steps. Said rule may comprise specifying an initial map $\mathcal{M}_1$ which is one of the maps $\mathcal{U}_k$ or $\varepsilon_k^{-1}$ or a composition of a plurality of maps $\mathcal{U}_k$, $\varepsilon^{-1}$, and wherein a t-th map $\mathcal{M}_t$, t≥2, is defined according to $\mathcal{M}_t = L_t \circ \mathcal{M}_{t-1}$ or $\mathcal{M}_t = \mathcal{M}_{t-1} \circ R_t$ or $\mathcal{M}_t = L_t \circ \mathcal{M}_{t-1} \circ R_t$, wherein $L_t$ and $R_t$ are one of the maps $\mathcal{U}_k$ or $\varepsilon_k^{-1}$ or a composition of a plurality of the 2K maps $\mathcal{U}_k$, $\varepsilon_k^{-1}$ such that $\mathcal{M}_T$ is equal to the noise mitigation map $\mathcal{M}$. The iterative contraction procedure ma comprise a step of deriving a tensor network representation of the initial map $\mathcal{M}_1$ comprising the subsequence and/or inverse channel tensors of the maps $\mathcal{U}_k$, $\varepsilon_k^{-1}$ whose composition results in $\mathcal{M}_1$, and T−1 iterative steps, wherein in the t-th iterative step, t=1, . . . , T−1, a (t+1)-th tensor network representation of $\mathcal{M}_{t+1}$ is derived by contracting the tensor network representations of $\mathcal{M}_t$ and the tensor network representation of respective ones of $R_{t+1}$ and $L_{t+1}$ according to a (t+1)-th contraction rule to thereby obtain a plurality of (t+1)-th tensors of said (t+1)-th tensor network representation.

This embodiment is a generalization of the from-the-middle-out contraction described above. The noise mitigation map is of the form $\mathcal{M} = \mathcal{U}_K \circ \ldots \circ \mathcal{U}_2 \circ \mathcal{U}_1 \circ \varepsilon_e^{-1} \circ \ldots \circ \varepsilon_{K-1}^{-1} \circ \varepsilon_K^{-1}$. For example, the initial map may be $\mathcal{M}_1 = \mathcal{U}_1 \circ \varepsilon^{-1}$, and the T–1 maps $\mathcal{M}_t$ may be defined according to $\mathcal{M}_t = \mathcal{M}_{t-1} \circ \varepsilon_t^{-1}$ for t=2, ..., K, and $\mathcal{M}_t = \mathcal{U}_t \circ \mathcal{M}_{t-1}$, for t=K+1, ..., 2K–1.

According to an embodiment, for at least one iterative step, and preferably for each iterative step, the first tensor network contraction algorithm may comprise instruction for compressing the (t+1)-th tensors such that their bond dimension is below the predetermined threshold value. In this way, the calculation of the value of tr[$\mathcal{M}(\rho_s)O$] may be carried out efficiently on the classical computer.

In one embodiment, compressing said tensors may comprise an execution of a truncation algorithms or an application of a variational algorithm. Such algorithms are known in the art and mentioned above.

According to an embodiment, said initial map $\mathcal{M}_1$ may be given by $\mathcal{M}_1 = \mathcal{U}_1 \circ \varepsilon_1^{-1}$ and said (t+1)-th map $\mathcal{M}_{t+1}$ may be given by $\mathcal{M}_{t+1} = \mathcal{U}_{t+1} \circ M_t \circ \varepsilon_{t+1}^{-1}$, and wherein the tensor network representation of $\mathcal{M}_{t+1}$ may be derived by contracting the tensor network representation of $\mathcal{M}_t$ and the tensor network representations of $\mathcal{U}_{t+1}$ and $\varepsilon_{t+1}^{-1}$ according to the (t+1)-th contraction rule.

This embodiment describes the from-the-middle-out contraction described above when each subsequence channel is of the form $\varepsilon_k = \mathcal{N}_k \circ \mathcal{U}_k$. In this case, $\mathcal{M}_1 = \mathcal{U}_1 \circ \varepsilon_1^{-1} = \mathcal{N}_1^{-1}$. Preferably, each noise channel $\mathcal{N}_k$ has a bond dimension below a threshold value. The threshold value is such that the tensors may be contracted efficiently by the classical computer.

When $\varepsilon_t = \mathcal{N}_t \circ \mathcal{U}_t$, preferably the tensor network representation of $\mathcal{N}_t^{-1}$, $\mathcal{U}_t$ and $\mathcal{U}_t^{-1}$ are derived, and the respective tensors are contracted with the tensors of the tensor network representation of $\mathcal{M}_{t-1}$ according to the t-th contraction rule to thereby obtain the t-th tensor network representation of $\mathcal{M}_t$. Preferably, the resulting tensors are compressed so that their bond dimension is below the threshold value.

According to an embodiment, at least one, and preferably all tensor network representations may comprise at least one tensor associated with each qudit, and preferably a single tensor associated with each qudit, wherein the tensor $B^{[k]}$ associated with the k-th qudit has at least one physical index and at least one virtual index.

According to a further embodiment, for at least one operator or map Q, and preferably for all operators and maps, the respective tensor network representation may be a matrix product operator representation, $Q = \sum_{a_1, \ldots, a_{N=0}}^{\chi-1} A_{a_0}^{[0]} \otimes A_{a_0 a_1}^{[1]} \otimes \ldots \otimes A_{a_{N-3} a_{N-2}}^{[N-2]} \otimes A_{a_{N-2}}^{[N-1]}$, wherein for any values of the virtual indicies $a_{k-1}$, $a_k$ the map $A_{a_{k-1} a_k}^{[k]}$ is acting on the k-th qudit, the map $A_{a_0}^{[0]}$ is acting on the 0-th qubit and the map $A_{a_{N-2}}^{[M-1]}$ is acting on the (N–1)-th qubit, and wherein $\chi$ is the bond dimension.

Preferably, each tensor network representation of this embodiment is a Matrix Product Operator tensor network representation, wherein each operator or map is represented as $Q = \sum_{a_1, \ldots, a_{N=0}}^{\chi-1} A_{a_0}^{[0]} \otimes A_{a_0 a_1}^{[1]} \otimes \ldots \otimes A_{a_{N-3} a_{N-2}}^{[N-2]} \otimes A_{a_{N-2}}^{[N-1]}$, wherein for any values of the virtual indicies $a_{k-1}$, $a_k$ the map $A_{a_{k-1} a_k}^{[k]}$ is acting on the k-th qudit, the map $A_{a_0}^{[0]}$ is acting on the 0-th qubit and the map $A_{a_{N-2}}^{[N-1]}$ is acting on the (N–1)-th qubit, and wherein $\chi$ is the bond dimension.

According to an embodiment, for at least one operator or map, and preferably for each operator or map the respective tensor network representation may be a projected entangled pair operator representation or a tree tensor network representation.

According to an embodiment, the effects of the informationally complete (IC) Positive Operator valued Measure (POVM) may be L-producible, L≥1, i. e., each effect is a tensor product of operators each of which is acting on at most L qudits, i. e., $\Pi_{m(k_0, \ldots, k_{N-1})} = \Pi_{k_0}^{(0)} \otimes \Pi_{k_1}^{(1)} \otimes \ldots \otimes \Pi_{k_{r-1}}^{(r-1)}$, wherein $\Pi_{k_n}^{(n)}$ acts on at most L qudits, and preferably the effects are 1-producible.

In one example, the effects of the informationally complete Positive Operator Valued Measure may be 1-producible. Then, for each qudit $q_n$, n=0, ..., N–1, there may exist local effects $\Pi_{k_n}^{(n)}$ acting only on the qudit $q_n$ and constituting a local informationally complete Positive Operator Valued Measure for said qudit $q_n$, the effect $\Pi_{k_n}^{(n)}$ having a measurement outcome $k_n$, such that the effect $\Pi_{m(k)}$ of the POVM is given by $\Pi_{m(k)} \otimes_{n=0}^{N-1} \Pi_{k_n}^{(n)}$ and the measurement outcome m(k) is a tuple m($k_0$, ..., $k_{N-}$).

According to an embodiment, deriving at least one of the tensor network representations may be at least partially, and preferably completely, carried out by an algorithm executed by the classical computer.

According to a second aspect, there is provided a computing system comprising a quantum processor and a classical computer, said computing system being configured to carry out the method according to anyone of the preceding aspect and/or embodiments.

According to a third aspect, there is provided a computer program product including instructions which, when the program is carried out by a computer system comprising a classical computer and a quantum processor, cause the computer system to carry out the method according to anyone of the preceding aspects and/or embodiments.

According to a fourth aspect, there is provided a computer program product including instructions which, when the program is carried out by a classical computer, cause the classical computer to carry out the tensor network contractions according to anyone of the preceding aspects and/or embodiments.

According to a fifth aspect, there is provided a computer-readable data carrier having stored thereon the computer program product of the third aspect.

According to a sixth aspect, there is provided a computer-readable data carrier having stored thereon the computer program product of the fourth aspect.

BRIEF DESCRIPTION OF THE DRAWINGS

In the following description, aspects of the present disclosure will be described in greater detail by way of examples, with reference to the drawings. In the drawings, FIG. 1. illustrates error-mitigated estimation of observable O via postprocessing measurement outcomes of a noisy quantum processor, according to some embodiments.

of the physical observable H, according to some embodiments.

Figure 5:
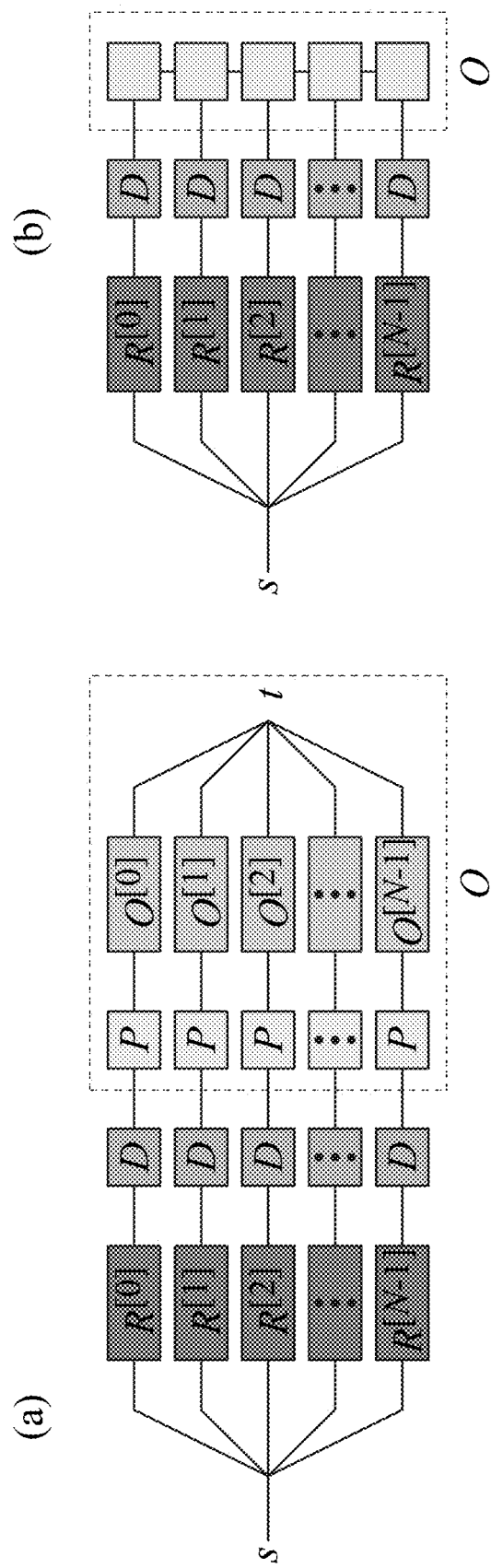

FIG. 5 illustrates a tensor network, according to some embodiments.

Figure 6:
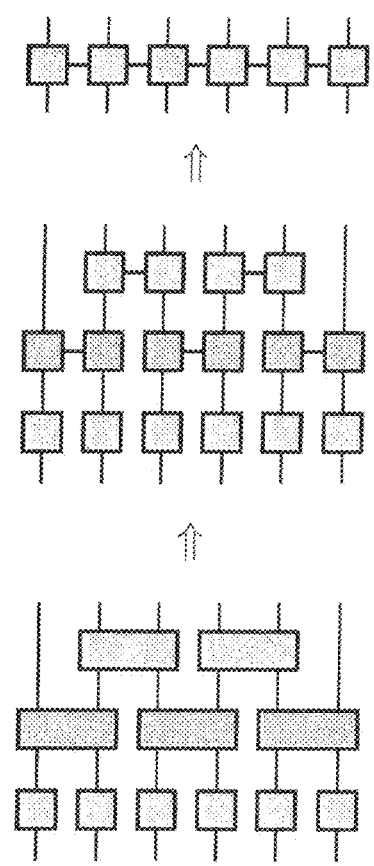

FIG. 6 illustrates a MPO construction for the inverse of the sparse Pauli-Lindblad noise model, according to some embodiments.

Figure 7:
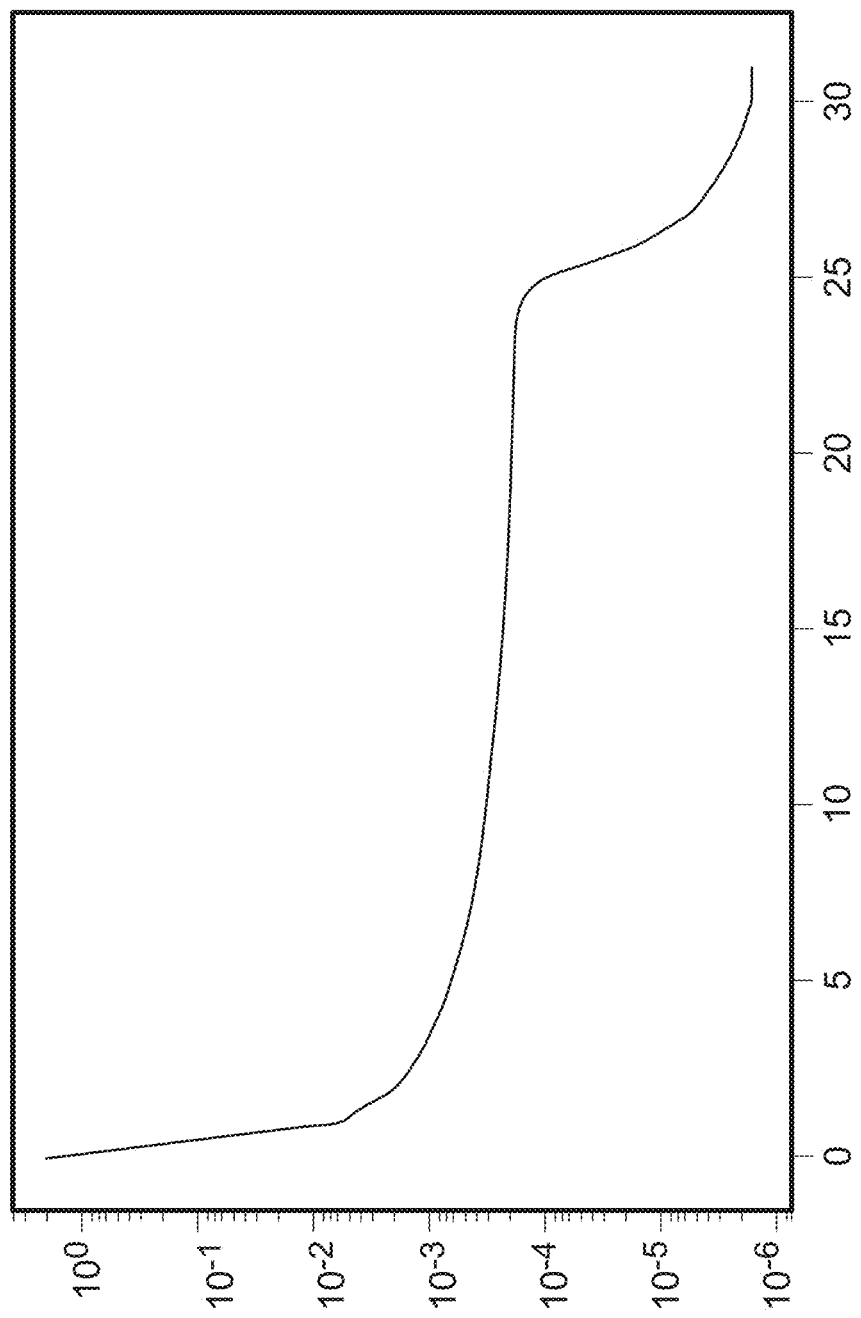

FIG. 7 illustrates typical singular values in the central link for the MPO M (arranged in the decreasing order), according to some embodiments.

Figure 8:
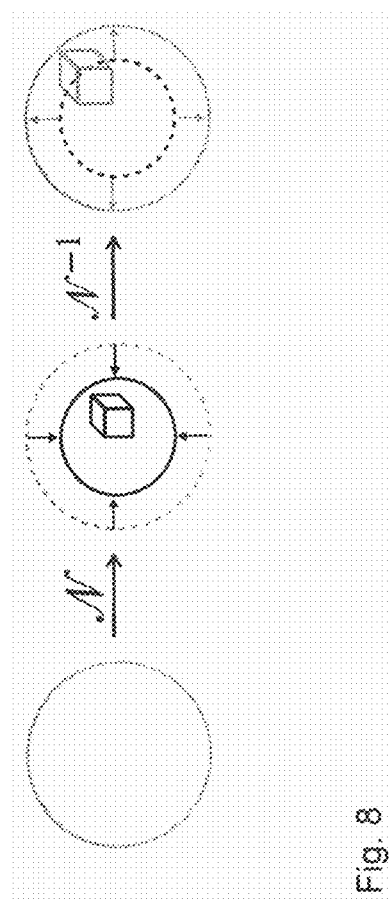

FIG. 8 illustrates a pictorial representation of the generalized Bloch ball transformation due to noise and noise inversion, according to some embodiments.

Figure 9:
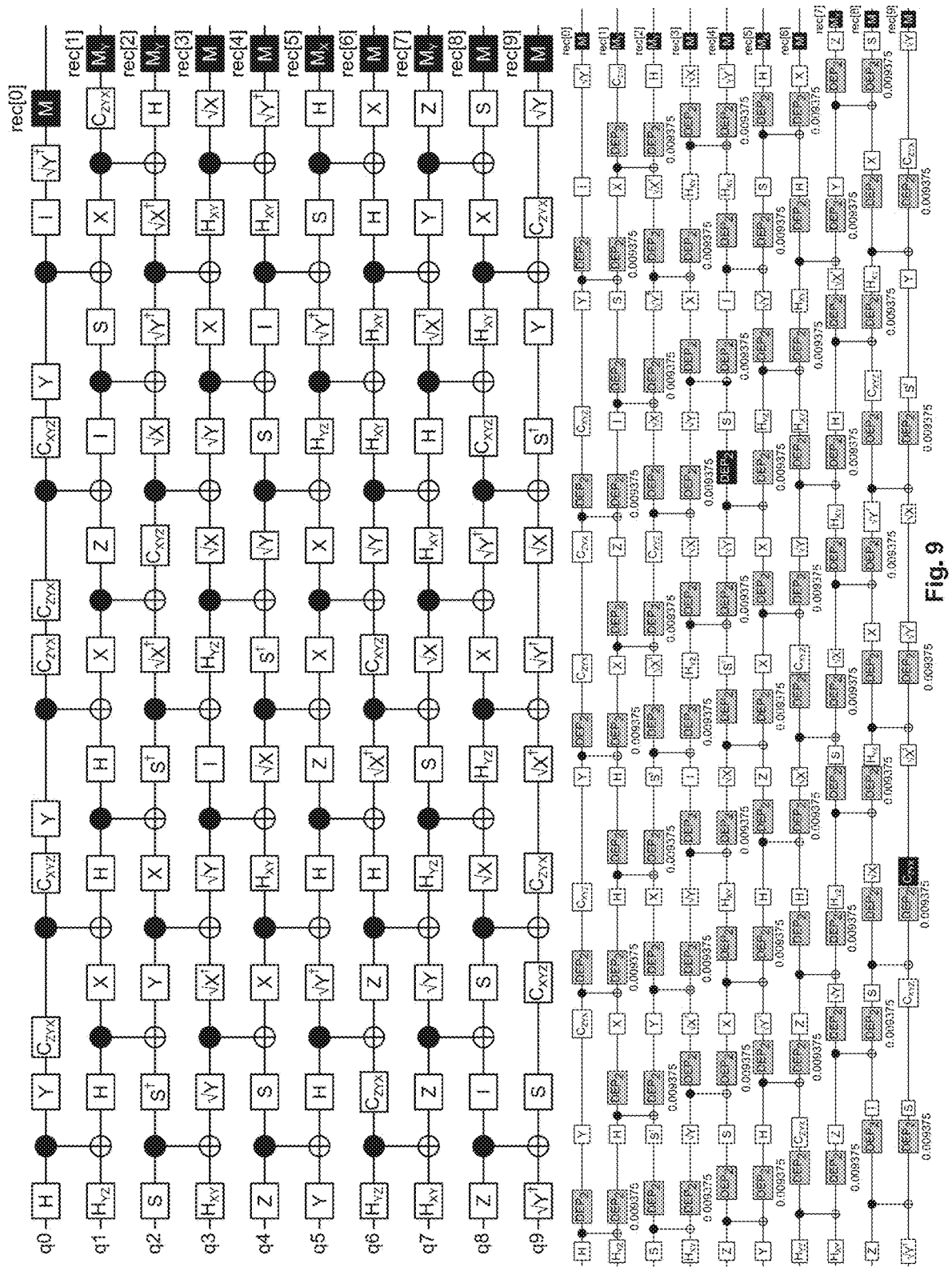

FIG. 9 illustrates stabilizer circuits, according to some embodiments.

Figure 10:
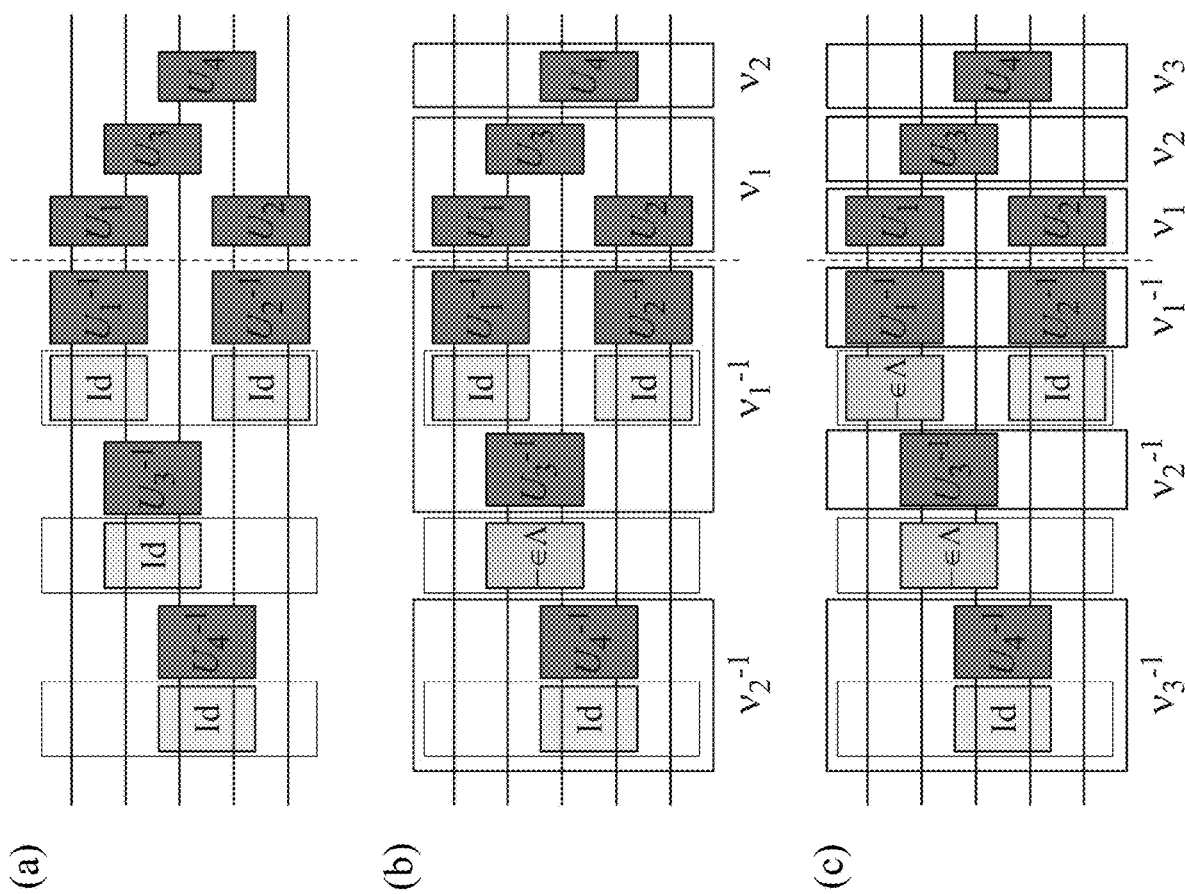

FIG. 10 illustrates perturbation theory for the noise-mitigation map with respect to the noise strength, according to some embodiments.

DETAILED DESCRIPTION

In some embodiments, a quantum circuit refers to a set of quantum-mechanical instructions to prepare, evolve, and measure the state of quantum bits or quantum digits.

In some embodiments, a quantum processor refers to a device that employs quantum-mechanical properties of information carriers, especially the quantum superposition, to enhance the space of encoded states and the space of logical operations available via executing a quantum circuit.

In some embodiments, a classical computer refers to a device for processing, storing, and displaying information encoded in discrete states of bits or digits.

Figure 1:
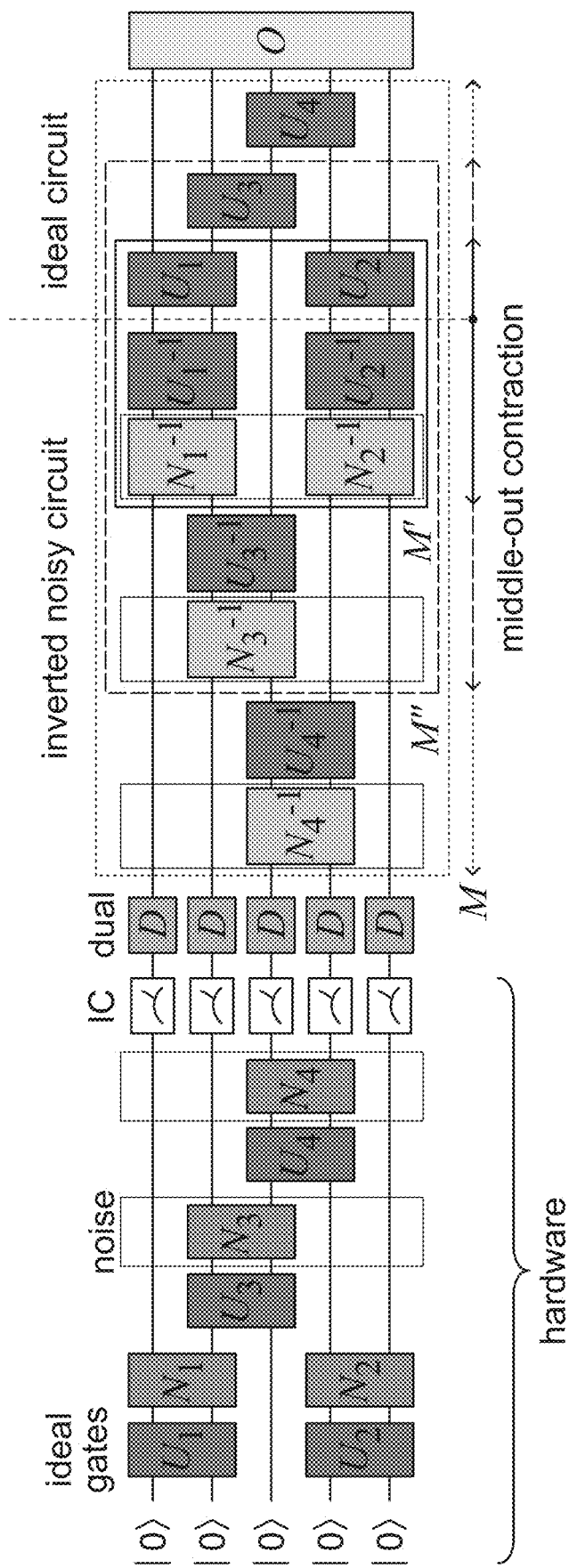

FIG. 1. illustrates error-mitigated estimation of observable O via postprocessing measurement outcomes of a noisy quantum processor. U and N denote an ideal quantum operation and the associated noise map, which can be generally nonlocal (grey boxes). D stands for a tensor of operators that are dual to effects in the informationally complete (IC) measurement. Noise mitigation module M is a tensor network that is efficiently contracted from the middle out.

I. Noisy Quantum Computation

A typical quantum simulator is based on the circuit implementation of quantum computation, where the qubits are initialized in the pure state $0^{\otimes N}$, then subjected to unitary gates U from some set of available gates, and finally measured (see FIG. 1). The set of gates reflects the hardware restrictions such as connectivity of qubits and availability of arbitrary single-qubit unitaries. The purpose of the hardware quantum simulator is to prepare a quantum state which would be difficult to simulate otherwise (by using a classical computer). For instance, the variational quantum eigensolver aims at preparing the ground state of a given Hamiltonian and is expected to speed up calculations of the ground state energies and binding affinities for biomolecules and protein-ligand complexes, thus reducing the cost of a drug design.

To get a desired physical quantity (e.g., the energy) the hardware-simulated state is to be measured. Outcomes of quantum measurements are known to have a probabilistic nature, and the corresponding mathematical description is given by the positive operator-valued measure (POVM). An informationally complete POVM is considered, whose effects span the whole space of operators acting on all N qubits available in the quantum processor. For instance, this can be achieved by using informationally complete POVM for each individual qubit (see FIG. 1 and details in Appendix A). Suppose that the physical observable O has components with a low Pauli weight (i.e., the Pauli string operators primarily contain identity operators), which takes place for a chemical Hamiltonian upon applying an appropriate fermion-to-qubit mapping. Then there is no need to collect exponentially many (in N) measurement outcomes and reconstruct the density operator $\varrho$ of the whole quantum register. The number of measurement shots S necessary to estimate the average value $tr[\varrho O]$ with precision E scales polynomially in N and linearly in $\varepsilon^{-2}$. For a finite set of measurement shots, the estimate $\overline{O}$ for $tr[\varrho O]$ and its standard deviation $\Delta\overline{O}$ are given by formulas in Appendix B. The idea is to associate each measurement shot k with an operator $D_k$ dual to the corresponding POVM effect so that $$\overline{O} = \frac{1}{s}\sum_k tr[D_k O].$$

In the case of local measurements, each measurement shot $k=(k_0, \ldots, k_{N-1})$ is composed of outcomes for individual qubits and $D_k = \otimes_{m=0}^{N-1} D_{k_m}^{[m]}$ (see FIG. 1, where local dual operators $\{D_{k_m}^{[m]}\}^k_m$ for the mth qubit form a tensor D). Postprocessing of the measurement outcomes and calculation of the estimates $\overline{O}$ and $\Delta\overline{O}$ become particularly straightforward if all the operators are in the Pauli transfer matrix (PTM) representation (Appendix C) and tensor network contractions are utilized (Appendix D).

In noisy circuits, none of the preparation, dynamics, and measurement steps are perfect but the preparation and measurements errors can be relocated to the dynamics part, where the most errors emerge. For this reason one may assume that the initialization and the measurements are perfect so that all noise is attributed to the gates. The noisy gate is described by a concatenation N∘U of the perfect unitary transformation $U[\bullet]=U\bullet U^\dagger$ and the completely positive and trace preserving map N that can either act on the same qubits as U does or affect more qubits due to the cross-talk coupling between them. The description herein allows the noise N to affect all qubits in the register provided the detailed and compact description of this map is given, e.g., in the form of the one dimensional tensor network with topology of the locally-purified density operator also known as the matrix product channel. The key requirement for the proposed noise mitigation algorithm is that the inverse map $N^{-1}$ has a compact tensor network representation with a modest bond dimension. This requirement is naturally met if N acts locally on several qubits in the vicinity of where the unitary map U nontrivially acts. The requirement is also met for a Pauli-Lindblad noise model with cross-talk, where N represents a concatenation of local Pauli channels so that $N^{-1}$ has bond dimension 4 (Appendix F). Given a general matrix-product-channel noise N, the inverse map can be found by a sweeping procedure, which results in the matrix-product-operator representation for $N^{-1}$.

Figure 2:
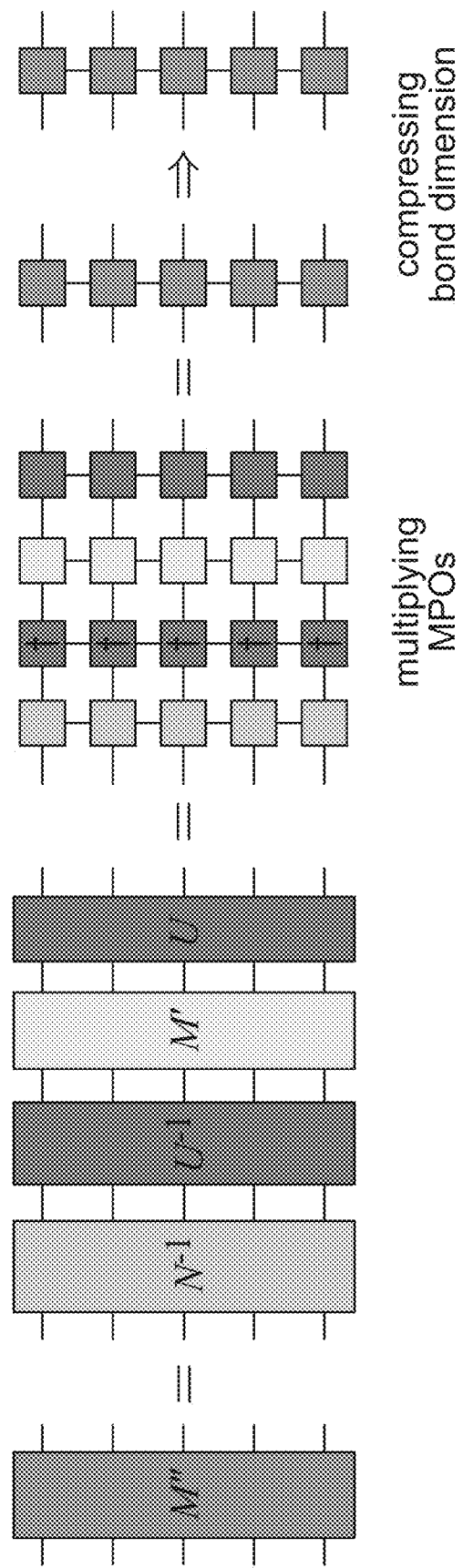
FIG. 2 illustrates matrix-product-operator (MPO) tensor network of linear topology, according to some embodiments.

FIG. 2 illustrates one iteration in the middle-out contraction: multiplication of layer MPOs and the bond dimension truncation (MPO compression), according to some embodiments.

II. Error Mitigation Strategy

Upon measuring the noisy quantum circuit, the measurement outcomes are processed on a classical computer. This enables one to mathematically deal with a non-physical map $N^{-1}$ that inverts the effect of noise. Suppose that in the postprocessing part one fully inverts the whole noisy circuit and then add the ideal noiseless circuit as shown in FIG. 1. In the case of infinite statistics, the density operator $\varrho$ at the output of dual operators is reverted to the state $(|0\rangle\langle 0|)^{\otimes N}$ and then mapped to the noiseless operator $|\Psi\rangle\langle\Psi|$ giving the desired average value $\overline{O}_{ideal}=\langle\Psi|O|\Psi\rangle$. In the case of finite number of samples, one obtains an unbiased estimation of $\overline{O}_{ideal}$. The described noise-mitigation map is denoted herein by M. If one naively builds M by concatenating all the maps layer by layer [i.e., $M=(\bigcirc_l \bigcirc_l) \circ \bigcirc_l (U_l^{-1} \circ N_l^{-1})$], then this is as demanding as simulating quantum computation on a classical computer. However, the calculation of M can be made computationally efficient and sufficiently accurate by exploiting the fact that every unitary layer $U_l$ and the corresponding map $U_l^{-1} \circ N_l^{-1}$ approximately cancel each other insuring a tensor network representation with a low bond dimension. The idea is shown in FIG. 1 and described in detail in what follows.

The map M is considered as a tensor network, whose contraction starts from the middle (where the inverted noisy circuit ends and the ideal circuit starts) and propagates outwards by involving two layers of the left side and one layer on the right side at each iteration. A single iteration reads $$M'' = U \circ M' \circ U^{-1} \circ N^{-1}. \quad (1)$$

The maps U, $U^{-1}$, and $N^{-1}$ are operators in the PTM representation and they adopt a computationally-efficient form called a matrix-product-operator (MPO) tensor network of linear topology depicted in FIG. 2. An MPO of bond dimension $\chi$ for an N-qubit map has the form $$\sum\nolimits_{a_0,\ldots,a_{N-2}=0}^{\chi-1} A_{a_0}^{[0]} \otimes A_{a_0 a_1}^{[1]} \otimes \ldots \otimes A_{a_{N-3} a_{N-2}}^{[N-2]} \otimes A_{a_{N-2}}^{[N-1]}, \quad (2)$$

where, for any fixed values of virtual indices $a_{m-1}$ and $a_m$, $A_{a_{m-1} a_m}^{[m]}$ is a map acting on mth qubit. Each iteration in Eq. (1) reduces to a standard multiplication of MPOs that yields an MPO with a multiplicative bond dimension (Appendix G 1).

Consider a typical hardware circuit composed of single-unitary gates and layers of non-overlapping cnot gates. Then the MPO form for a unitary layer U has the bond dimension 4 and immediately follows from a trivial decomposition of each cnot superoperator (Appendix E). Needless to say, the MPO for $U^{-1}$ is readily obtained from the MPO for U via conjugation and has the same bond dimension. The noise-inversion map $N^{-1}$ is efficiently represented by an MPO with a modest bond dimension either from a local structure of the known noise (tomography of individual noisy gates), or through a characterised Pauli-Lindblad model with crosstalk, or via inversion of the matrix-product-channel noise. In the case of the Pauli-Lindblad model with a nearest-neighbour cross-talk, the noisy layer N is efficiently represented as a sequence of commuting two-qubit Pauli channels applied to adjacent qubits, with the resulting MPO for $N^{-1}$ having bond dimension $\chi_n=4$ (Appendix F). Should the two-qubit channels be depolarizing, then the MPO bond dimension for $N^{-1}$ reduces to $\chi_n=2$ (Appendix F). Assuming $N^{-1}$ has some bond dimension $\chi_n$ and the current iteration M' has bond dimension $\chi'$, the next iteration map M" in Eq. (1) has bond dimension $\chi''=16\chi_n\chi'$. This results in the exponentially growing bond dimension $16^L \chi_n^{L-1}$ for a circuit of depth L. To overcome this difficulty, the MPO is compressed after each iteration to have the bond dimension at most $\chi_{max}$. This is achieved either by truncating the smallest singular values in the canonical representation for the MPO or by variational methods. The compression error has a known upper bound in terms of the Frobenius norm and can be translated into an upper bound for the truncation-induced error in estimating the observable (Appendix G2).

The most crucial feature of the proposed from-the-middle-out contraction for M is that it captures cancellation effects for unitaries and their inverses when the noise level is reasonably small and the map N is close to the identity transformation Id. Then Id is the leading contribution in M and Id has a trivial bond dimension 1. When the noise level $\epsilon$ is small but nonzero, the expansion $N \approx Id + \epsilon\Lambda$ leads to $U \circ N^{-1} \circ U^{-1} \approx Id - \epsilon U \circ \Lambda \circ U^{-1}$. Continuing this line of reasoning for iterative Eq. (1), the second largest singular value in every MPO link for M is of the order of $\epsilon$. As a result, the MPO compression error is at most linear in $\epsilon$. Numerical analysis of singular values justifies this observation (Appendix H). For the sufficiently large bond dimension Xmax exceeding a certain threshold, the compressed MPO reproduces all first-order singular values of the exact MPO, and then the truncation error exhibits a transition to the order of $\epsilon^2$.

The memory cost of storing an N-qubit MPO scales as $\chi_{max}^2 N$ and the computational cost of MPO multiplication is of the same order due to its triviality. The largest computational cost comes from the MPO compression and scales as $\chi_{max}^3 N$. For a quantum circuit of depth L, the total computational cost of contracting M from the middle out is therefore $O(\chi_{max}^3 NL)$. Remarkably, such a scalable tensor-network-based (TNB) noise mitigation leads to the observable estimation error at most linear in the noise intensity (provided the measurement shot noise is sufficiently suppressed). In the case of stabilizer circuits with the Pauli-Lindblad noise (accounting for the cross talk among nearest neighbour qubits), the bond dimension $\chi_{max} > 16(N-1)L$ suffices to fully capture all first-order noisy contributions in the compressed MPO for M and shift the compression error to the second order of noise intensity (Appendix K). This requires a computational cost $O(N^4 L^4)$ that is polynomial both in the number of qubits N and the circuit depth L. A higher-order-polynomial computational cost surely makes it possible to suppress the compression error even further (Appendix K).

Similarly to the PEC, the TNB error mitigation amplifies the measurement shot noise. The measurement overhead $\gamma$ is the ratio of standard deviations in estimations of the observable after and prior to noise mitigation. $\gamma^2$ is the scaling factor in the number of shots needed to get a desired estimation precision and quantifies quantum computational resources. In PEC, the measurement overhead originates from the physical simulation of $N^{-1}$ via sampling and averaging over unitary operations from the quasiprobability representation for $N^{-1}$. Suppose the noise is a mixture $N=(1-\epsilon)Id+\Sigma\Lambda_p$, where $\Lambda_p[\bullet]=\Sigma_{a\neq 9} p_a \sigma_a \bullet \sigma_a$ is a random unitary quantum channel and unitary operators are nontrivial Pauli strings $\sigma_a = \otimes_{m=0}^{N-1} \sigma_{a_m}$. Then $N^{-1} \approx (1+\epsilon)\text{Id} - \epsilon \Lambda_p$ and $\gamma_{PEC} \approx +2\epsilon$ for this layer. In the TNB error mitigation, $N^{-1}$ is a purely mathematical map kept in the memory of a classical computer, so the absence of complete positivity does not cause a problem. The dual map $(N^{-1})^\dagger$ formally describes the evolution of an observable O in the Heisenberg picture [in this case there is self duality, $(N^{-1})^\dagger = N^{-1}$]. For a Pauli string observable $O = \sigma_\beta$, $(N^{-1})^\dagger[\sigma_\beta] = \gamma_{TNB} \sigma_\beta$ with the measurement overhead $\gamma_{TNB} \approx 1\epsilon - \epsilon \Sigma_{\alpha \neq 0} p_\alpha (-1)^{\langle \alpha, \beta \rangle}$, where $\langle \alpha, \beta \rangle = 0(1)$ if $\sigma_\alpha$ and $\sigma_\beta$ commute (anticommute). Accordingly, $\gamma_{TNB} \leq \gamma_{PEC}$ and $\gamma_{TNB} < \gamma_{PEC}$ whenever $\sigma_\beta$ commutes with at least one of $\sigma_\alpha$ for which $p_\alpha \neq 0$. If $\sigma_\beta$ commutes with all non-trivially contributing operators $\sigma_\alpha$, then $\gamma_{TNB} = 1$. In experimental studies of Pauli-Lindblad noise models, the distribution $\{p_\alpha\}_\alpha$ is roughly flat, which means that typically commuting and anticommuting terms cancel each other $\rangle \approx 0$) and $\gamma_{TNB} \approx 1 + \epsilon \sqrt{\gamma_{PEC}}$ if $\beta \neq 0$. Dealing with a general observable O=, where the expansion coefficients $\{c_\beta\}$ are all of the same order again gets the averaged overhead $\gamma_{TNB} \approx 1 + \epsilon \sqrt{\gamma_{PEC}}$. Observables of low Pauli weight (whose components act trivially on all but w qubits) such as a quantum chemical Hamiltonian generally have even smaller measurement overhead $$\gamma_{TNB} \approx 1 + \frac{w+2}{N} \epsilon < \sqrt{\gamma_{PEC}}$$

if the cross-talk noise affects nearest qubits in the linear topology. Since the measurement overhead scales exponentially with the circuit depth L, the improvement in the measurement overhead becomes drastic even for a typical observable [$\gamma_{TNB} \approx (1+\epsilon)^L << (1+2\epsilon)^L \approx \gamma_{PEC}$], not to mention a low-Pauli-weight one $$\left[ \gamma_{TNB} \approx \left(1 + \frac{w+2}{N}\epsilon\right)^L \ll (1+2\epsilon)^L \approx \gamma_{PEC} \right].$$

To resume, the TNB noise mitigation algorithm is as follows:
1. Given an ideal circuit (to be implemented later via a noisy hardware), find MPO representation for each unitary-map layer U and its conjugation $U^{-1}$.
2. For each unitary layer, characterized the noise N accompanying it in the actual hardware and find MPO representation for $N^{-1}$.
3. Construct the noise-inversion map M in the middle-out fashion by sequential applications of Eq. (1) in terms of tensor networks: multiply MPOs and compress the result so as to keep the bond dimension $\leq \chi_{max}$.
4. Monitor the compression error for it to be below some desired value or take it into account when estimating the energy error.
5. Implement circuit in the noise-characterized quantum hardware and collect samples from informationally-complete measurements.
6. Contract the whole tensor network in FIG. 2, i.e., measurement outcomes, dual operators, the noise-mitigation map M, and the observable operator. The contraction is a single noise-mitigated value $\overline{O}_{n.m.}$.
7. Estimate error $\Delta \overline{O}_{n.m.}$ in the observable estimation via the standard statistical methods and incorporate the compression error.

III. Results

Figure 3:
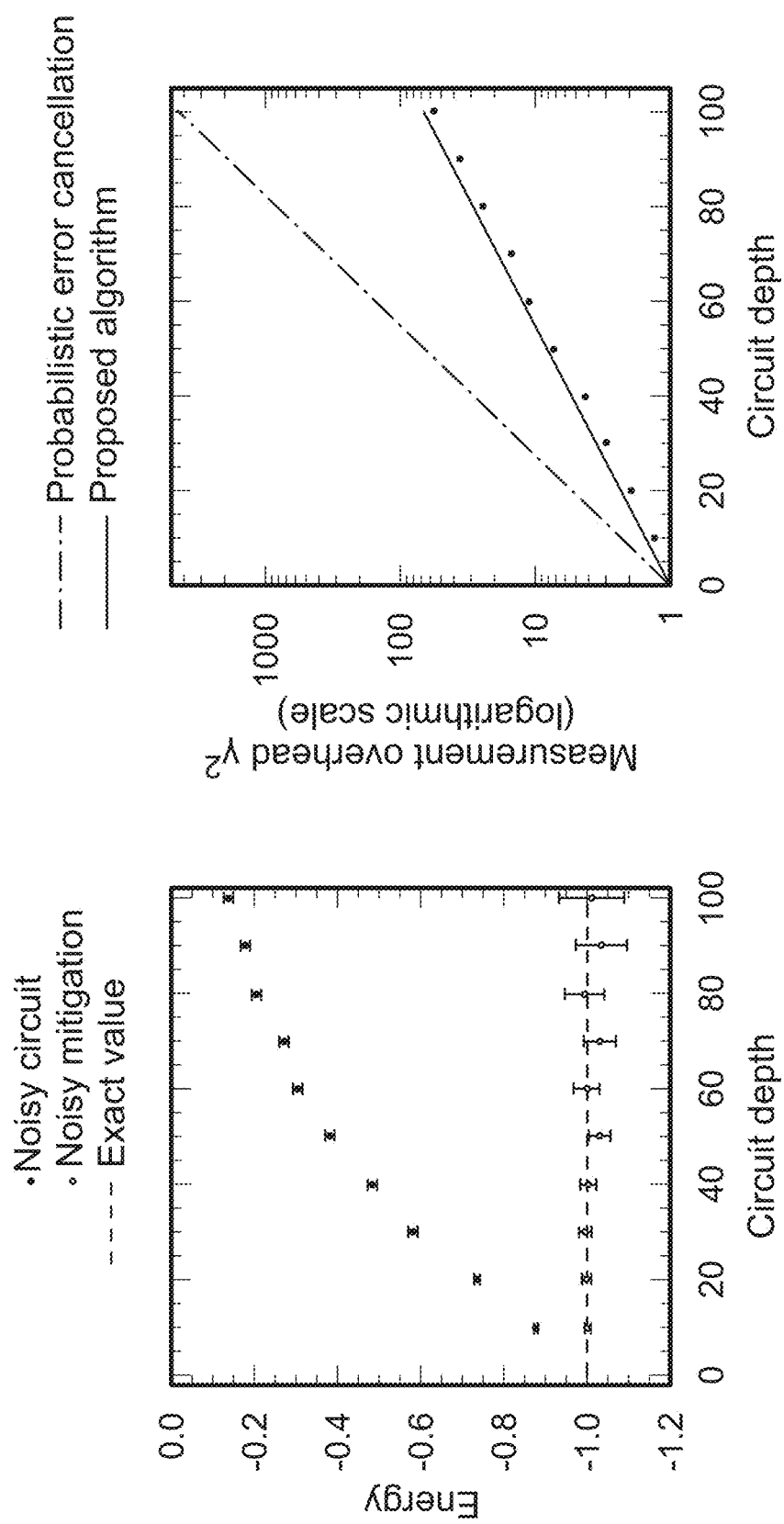
FIG. 3 illustrates the results of noise mitigation in a 10-qubit stabilizer circuit while estimating the ground energy of some specific Hamiltonian, according to some embodiments.

The stabilizer quantum circuits serve as a natural testbed for studying scalability of quantum informational protocols. FIG. 3 depicts the results of noise mitigation in a 10-qubit stabilizer circuit while estimating the ground energy of some specific Hamiltonian (see Appendix J for details of the circuit structure, the noise structure, and the Hamiltonian, which is a linear combination of stabilizer Pauli strings). The top figure in FIG. 3 illustrates noise mitigation in 10-qubit stabilizer quantum circuits of increasing depth. The bottom figure in FIG. 3 illustrates a comparison of measurement overheads in the PEC and the proposed TNB noise mitigation.

The deepest circuit of L=100 layers and contains 450 noisy cnot gates, each gate being accompanied by the noise of intensity $\epsilon = 0.005$. The bond dimension $\chi_{max} = 300$ in the MPO for M does not induce a noticeable truncation error as the estimated values $\overline{O}_{n.m.}$ deviate from the exact ones within the estimated statistical error $\Delta \overline{O}_{n.m.}$. FIG. 3 also shows that the measurement overhead in the proposed TNB noise mitigation is a square root of the corresponding measurement overhead in the PEC noise mitigation, which provides a prominent improvement especially for deep circuits.

We have performed the same numerical experiment for larger stabilizer circuits (the exact value for the observable is −1.0). The results are as follows:

For 50 qubits, 20 layers (~500 cnot gates, ~1000 single unitary gates), the noise intensity $\epsilon = 0.001$ for each cnot, and the bond dimension $\chi_{max} = 300$, the noisy observable estimate $\overline{O}_{noisy} = -0.898120 \pm 0.001958$ and the noise-mitigated observable estimate $\overline{O}_{n.m.} = -0.998913 \pm 0.002203$.

For 50 qubits, 30 layers (~750 cnot gates, ~1500 single unitary gates), the noise intensity $\epsilon = 0.001$ for each cnot, and the bond dimension $\chi_{max} = 300$, the noisy observable estimate $\overline{O}_{noisy} = -0.806520 \pm 0.002667$ and the noise-mitigated observable estimate $\overline{O}_{n.m.} = -0.990484 \pm 0.003340$.

For 40 qubits, 40 layers (~800 cnot gates, ~1600 single unitary gates), the noise intensity $\epsilon = 0.001$ for each cnot, and the bond dimension $\chi_{max} = 520$, the noisy observable estimate $\overline{O}_{noisy} = -0.723800 \pm 0.003423$ and the noise-mitigated observable estimate $\overline{O}_{n.m.} = -1.002373 \pm 0.004908$.

As a quantum chemical example one may consider $H_4$ molecule whose active space is covered by 8 qubits. A variational-quantum-eigensolver circuit, which prepares a good approximation of the ground state (whose energy deviates from the exact ground state energy −3524.884 mHa by 0.77 mHa), contains 100 full-connectivity cnots and 68 single unitary gates. The noise is simulated in such a circuit by 2-local depolarising channels spanning the range of qubits after each (generally nonlocal) cnot gate. The noise intensity $\epsilon = 0.001$. Energy estimation in noisy circuit results in −3426.018±0.246 mHa (deviation from the exact value by 99 mHa). However, application of the noise-mitigation map with bond dimension $\chi = 500$ yields −3526.143±0.290 mHa and this result reproduces the sought ground state energy within the chemical accuracy (1.6 mHa).

APPENDIX A—INFORMATIONALLY COMPLETE POVM

Informationally complete POVM for a single qubit contains at least 4 effects $\{\Pi_k\}_k$. The effects are Hermitian positive semidefinite operators ($\Pi_k^\dagger = \Pi_k \geq 0$) summing to the identity operator ($\Sigma_k \Pi_k = I$). Informational completeness implies that dim Span($\{\Pi_k\}_k$)=4 and the equality tr[$\varrho \Pi_k$]= tr[$\varrho' \Pi_k$] holds true for all k if and only if $\varrho = \varrho'$, i.e. the quantum state is uniquely determined by the probability distribution of outcomes. Dual operators $\{D_k\}_k$, are defined through the linear inversion formula $$\varrho = \sum_k tr[\varrho \Pi_k] D_k \quad (A1)$$

that relates the density operator $\varrho$ and the probability distribution $\{tr[\varrho \Pi_k]\}_k$.

For example, consider a measuring apparatus that performs a projective measurement in the eigenbasis of one of the Pauli operators $\sigma_x$, $\sigma_y$, $\sigma_z$. If the bases are chosen randomly in accordance with the probability distribution $(p_x, p_y, p_z)$, then $$\Pi_{z+} = p_z|0\rangle\langle 0|, \Pi_{z-} = p_z|1\rangle\langle 1|, \quad (A2)$$

$$\Pi_{x\pm} = p_x|\pm\rangle\langle\pm|, \Pi_{y\pm} = p_y|\pm i\rangle\langle\pm i|, \quad (A3)$$

where $\{|0\rangle, |1\rangle\}$ is the standard computational basis for a qubit $$(\sigma_z|0\rangle = |0\rangle, \sigma_z|1\rangle = -|1\rangle), \pm = \frac{1}{\sqrt{2}}(|0\rangle|\pm\rangle 1\rangle), \text{ and}$$

$$|\pm i\rangle = \frac{1}{\sqrt{2}}(|0\rangle \pm i|1\rangle).$$

Since dim Span$(\{\Pi_k\}_k) = 4$, the POVM is informationally complete. Physically this corresponds to a possibility of inferring all the Bloch vector components $tr[\varrho \sigma_\alpha]$, $\alpha = x, y, z$ from the measurement data. The dual operators are not unique in general [for instance, in this case because the number of POVM effects (six) is greater than the dimension of the operator space (four)]. A suitable set of duals is $$D_{a\pm} = \frac{1}{2}(I \pm p_\alpha^{-1} \sigma_\alpha). \quad (A4)$$

Given a quantum register of N qubits, where each qubit is measured individually in the informationally complete way, the linear inversion formula for the whole density operator of all qubits reads $$\varrho = \sum_{k_0, \ldots, k_{N-1}} tr\left[\varrho \bigotimes_{m=0}^{N-1} \Pi_{k_m}^{[m]}\right] \bigotimes_{m=0}^{N-1} D_{k_m}^{[m]}, \quad (A5)$$

where $\Pi_{k_m}^{[m]}$ and $D_{k_m}^{[m]}$ are the POVM effect and its dual operator for the m th qubit, respectively.

Figure 4:
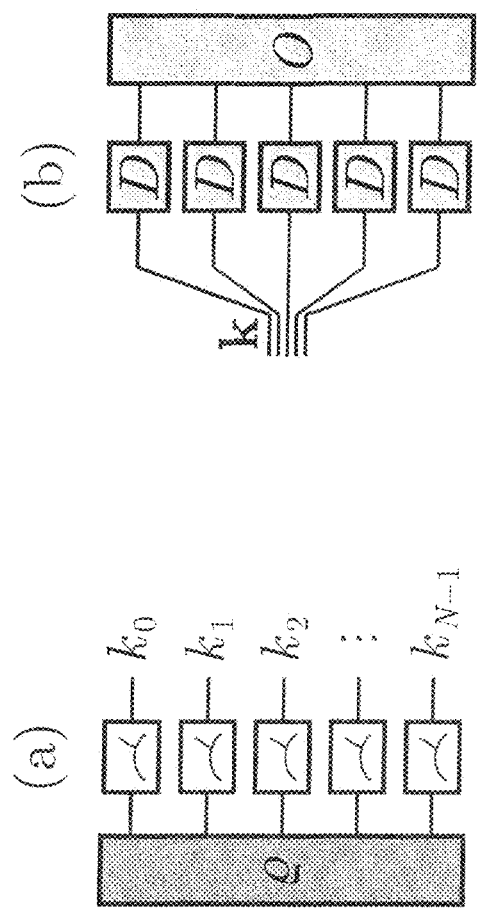
FIG. 4 illustrates: (a) Measurement outcomes for individual qubits form an N-tuple $(k_0, \ldots, k_{N-1})$ k; and (b) graphical representation for a real-valued random variable $\zeta_k := tr[HD_k]$ contributing to the estimation $$\overline{H} = \frac{1}{s}\sum_{k \in S} \zeta_k$$

FIG. 4 illustrates: (a) Measurement outcomes for individual qubits form an N-tuple $(k_0, \ldots, k_{N-1})$ k; and (b) graphical representation for a real-valued random variable $\zeta_k := tr[HD_k]$ contributing to the estimation $$\overline{H} = \frac{1}{s} \sum_{k \in S} \xi_k$$

of the physical observable H.

APPENDIX B—ESTIMATION OF PHYSICAL OBSERVABLES WITH A FINITE SET OF MEASUREMENT OUTCOMES

Suppose the circuit is run S times and all N qubits are measured individually each time via a fixed informationally complete POVM. Then one gets a collection S of S measurement outcomes, with each outcome being an N-tuple $(k_0, \ldots, k_{N-1}) \equiv k$, see FIG. 2(a). The density operator at the circuit output is estimated as $$\varrho_S = \frac{1}{s} \sum_{k \in S} D_k,$$

where $D_k \equiv \bigotimes_{m=0}^{N-1} D_{k_m}^{[m]}$. For a finite number S of samples, the operator $\varrho_S$ may have negative eigenvalues; therefore, $\varrho_S$ is referred to as a quasistate. In the limit of infinitely many measurement outcomes, $\varrho_\infty := \lim_{S \to \infty} \varrho_S$ is the true density operator at the output of the quantum circuit.

Suppose one estimates a physical observable with the corresponding quantum operator O, then each measurement outcome k induces a real-valued random variable $\zeta_k := tr[D_k O]$. The mean $$\overline{O} = \frac{1}{s} \sum_{k \in S} \xi_k$$

defines an unbiased estimate for the observable, and this estimate is a random variable itself. (The particular realization for the value of $\overline{O}$ is obtained by running a quantum computation S times.) Since all the random variables $\{\zeta_k\}_{k \in S}$ are independent and identically distributed, the variance $$\text{Var}(\overline{O}) = \frac{1}{s} \text{Var}(\xi),$$

where $\zeta$ is any of $\zeta_k$. On the other hand, each Var($\zeta$) can be unbiasedly estimated as $$\frac{1}{S-1} \sum_{k \in S} (\xi_k - \overline{O})^2,$$

so the final statistical error in estimating the observable reads $$\Delta \overline{O} = \sqrt{\frac{1}{S(S-1)} \sum_{k \in S} (tr[D_k O] - \overline{O})^2}. \quad (B1)$$

Formula (B1) accounts errors originating from a finite number S of samples (measurements) available in practice. It is equally applicable for both noisy and noiseless circuits, with a difference between the cases being in the set S of observed measurement outcomes ($S = S_{noisy}$ or $S = S_{ideal}$).

APPENDIX C—PAULI TRANSFER MATRIX REPRESENTATION

Consider a linear space of operators acting on the 2-dimensional Hilbert space for a single qubit. Since the identity operator $I \equiv \sigma_0$ and the conventional set of Pauli operators $\sigma_x \equiv \sigma_1$, $\sigma_y \equiv \sigma_2$, $\sigma_z \equiv \sigma_3$ altogether form a basis in this space, any operator A is uniquely determined by a 4-dimensional vector (rank-1 tensor) $\alpha$ with components $$a_\alpha := \frac{1}{\sqrt{2}} tr[A\sigma_\alpha],$$

a=0, 1, 2, 3. The inverse formula reads $$A = \frac{1}{\sqrt{2}} \sum_{\alpha=0}^{3} a_\alpha \sigma_\alpha.$$

The Hilbert-Schmidt scalar product of operators A and B is $tr[A^\dagger B] = a^\dagger b$, i.e., corresponds to the conventional scalar product of vectors a and b.

A linear map E on the space of qubit operators is uniquely determined by the 4×4 matrix (rank-2 tensor) $\mathfrak{E}$ with elements $$\mathfrak{E}_{\alpha\beta} := \frac{1}{2} tr[\sigma_\alpha E(\sigma_\beta)], \alpha, \beta = 0, 1, 2, 3, \quad (C1)$$

which defines the Pauli transfer matrix (PTM) representation. In the PTM representation, the operator E(A) corresponds to the product $\mathfrak{E}a$.

A multiqubit generalization of the PTM representation is straightforward. In the case of N qubits, the operator A corresponds to the vector $$a_\alpha = \frac{1}{\sqrt{2^N}} tr[A\sigma_\alpha],$$

where $a:=(a_0, \ldots, a_{N-1})$ and $\sigma_a := \otimes_{m=0}^{N-1} \sigma_{a_m}$. The PTM representation for an N-qubit map E reads $$\mathfrak{E}_{\alpha\beta} := \frac{1}{2^N} tr[\alpha_\alpha E(\sigma_\beta)].$$

The PTM representation is advantageous as it comes with a straightforward method for constructing composite maps. The PTM form of a composition of two maps (E=F∘G) is simply the matrix product of the individual PTM parts ($\mathfrak{E}=\mathfrak{F}\mathfrak{G}$). Similarly, the PTM representation for a tensor product of maps (E=F⊗G) is merely a tensor product of the corresponding PTM representations for the maps involved ($\mathfrak{E}=\mathfrak{F}\otimes\mathfrak{G}$). Both properties make the PTM representation ideal for representing a collection of maps acting in succession and potentially on different qubits (such as quantum gates).

APPENDIX D: TENSOR NETWORK CALCULATIONS

Tensor networks provide a computationally efficient description of many quantum-mechanical objects, e.g., the quantum state or a quantum operator. This section outlines how tensor networks can be used to calculate the estimate $\overline{O}$ and its error $\Delta\overline{O}$ for a desired Hermitian operator H based on a given collection S of S measurement outcomes.

1. Tensor Network for the Quasistate

Let us enumerate multiindices k in the set S by a counter s=0, ..., S−1, where S is the total number of measurement shots, i.e., $S=\{k(s)\}_{s=0}^{S-1}$. Each k(s) is a tuple $(k_0, \ldots, k_m, \ldots, k_{N-1})$. The set S can be viewed as a two-dimensional array of shape (N, S). The quasistate $$\varrho_S = \frac{1}{s} \sum_{k \in S} D_k = \frac{1}{s} \sum_l 1_S(l) D_l,$$

where $1_S(\bullet)$ is the indicator function for the set S and l labels all multiqubit POVM elements and their duals (exponentially many in N). The indicator function adopts a compact tensor network representation if one considers a collection $\{k_m(s)\}_{s=0}^{S-1}$ of measurement outcomes for each individual qubit number m and introduce the selector matrix $R^{[m]}$ with elements $R_{sl}^{[m]} \in \{0,1\}$ such that $R_{sl}^{[m]}=1$ if and only if the sth multiindex k has mth component equal to l. In terms of the Kronecker delta symbol, $R_{sl}^{[m]}=\delta_{k_m(s),l}$. Then the quasistate takes the form $$\varrho_S = \frac{1}{s} \sum_{s=0}^{S-1} \otimes_{m=0}^{N-1} \sum_l R_{sl}^{[m]} D_l. \quad (D1)$$

The set of single-qubit dual operators $\{D_l\}_l$ can be considered as a tensor D shown in FIG. 5. FIG. 5 illustrates a tensor network for $\zeta_k \equiv tr[D_k O]$. The Hamiltonian O is either the sum of Pauli strings (a) or a matrix product operator (b) in the Pauli transfer matrix representation.

In the PTM representation, the tensor D has order 2, i.e., it is represented by a matrix. In the case of duals (A4), the explicit form of this matrix reads $$D = \frac{1}{\sqrt{2}} \begin{pmatrix} 1 & p_x^{-1} & 0 & 0 \\ 1 & -p_x^{-1} & 0 & 0 \\ 1 & 0 & p_y^{-1} & 0 \\ 1 & 0 & -p_y^{-1} & 0 \\ 1 & 0 & 0 & p_z^{-1} \\ 1 & 0 & 0 & -p_z^{-1} \end{pmatrix}, \quad (D2)$$

where each odd (even) row is a PTM representation of the corresponding dual operator $D_{\alpha+}(D_{\alpha-})$, a=1,2,3. A single term $\otimes_{m=0}^{N-1} \Sigma_l R_{sl}^{[m]} D_l$ corresponds to a tensor network on the left from O in FIG. 5 with a fixed hyperindex s. Summing over the hyperindex s and dividing the result by the number of shots, S gets the quasistate (D1).

2 Tensor Network for the Observable Operator

The physical observable O is given in the form of an operator acting on the $2^N$-dimensional Hilbert space of N qubits. In quantum chemistry problems, upon utilizing a fermion-to-qubit mapping, the operator O is represented as a sum $O=\Sigma_a c_\alpha \sigma_a$ of Pauli operator strings $\sigma_\alpha = \otimes_{m=0}^{N-1} \sigma_{a_m}$, where the Pauli operator $\sigma_{a_m}$ acts on the mth qubit, $a_m \in \{0,1,2,3\}$. Let us use symbol t to enumerate the multiindices $a \equiv (a_0, \ldots, a_{N-1})$ contributing to the sum (i.e., those for which $c_a \neq 0$). In typical physical and chemical problems, the number of contributing Pauli strings (dimension of index t) is polynomial in the number of qubits N in contrast to the exponentially many contributions for a general observable O. Then in full analogy with the quasistate, the operator O adopts the form $$O = \sum_t \bigotimes_{m=0}^{N-1} \sum_{\beta=0}^{3} O_{t\beta}^{[m]} \sigma_\beta, \qquad (D3)$$

where for all m=1, ..., N−1 the selector matrix $O^{[m]}$ defines the indicator coefficient $O_{t\beta}^{[m]}=\delta_{\alpha_m(t),\beta}$ such that $O_{t\beta}^{[m]}=1$ if and only if the tth multiindex α has mth component equal to β; whereas for m=0 it also contains the coefficient $c_{\alpha(t)}$ for the tth Pauli string, i.e., $O_{t\beta}^{[0]}=c_{\alpha(t)}\delta_{\alpha_0(t),\beta}$. The set of single-qubit Pauli operators $\{\sigma_\beta\}_{\beta=0}^{3}$ can be considered as a 'Pauli' tensor P shown in FIG. 3(a). In the PTM representation, P is a trivial 4×4 identity matrix multiplied by $\sqrt{2}$, so this tensor can be omitted from the tensor network diagram for the operator O in FIG. 5(a) with a proper rescaling. Note that the tensor network contains a hyperindex t, which can be readily summed over in the popular packages Quimb and Cotengra. In this sense, the hyperindex t is internal as it is summed over (in contrast to the hyperindex s in the quasistate, which enables us to calculate the error $\Delta\overline{O}$, see explanation in Appendix D3).

Alternatively, the operator O can be originally given in the form of a tensor network, e.g., a well known linear tensor network called the matrix product operator (MPO). In the PTM representation, the MPO O takes the form of the unnormalized matrix product state depicted in FIG. 5(b). This approach to represent the observable is generally more efficient as compared to Eq. (D3) because the bond dimension can be generally much less than the number of Pauli strings in O.

3. Tensor Network Contraction

The sth measurement shot gives a particular value $\zeta(s):=$ $\zeta_{k(s)}\equiv\mathrm{tr}[D_{k(s)}O]$ for the random variable $\zeta_k$. This value $\zeta(s)$ is exactly the tensor-network contraction shown in FIG. 3 [subfigures (a) and (b) differ in the representation for the operator O only, see Appendix D2]. Connected legs indicate indices that are summed over. Contracting either of the tensor networks in FIG. 5 with a fixed value of the outer hyperindex s, gets exactly $\zeta(s)$. The contraction is routinely performed with the help of packages Quimb and Cotengra (the latter one finds the optimal contraction tree).

The estimate $\overline{O}$ for the observable O after S measurement shots is $$\overline{O} = \frac{1}{S}\sum_{s=0}^{S-1}\xi(s). \qquad (D4)$$

The estimation error (8) reduces to $$\Delta\overline{O} = \sqrt{\frac{1}{S(S-1)}\sum_{s=0}^{S-1}(\xi(s)-\overline{O})^2}. \qquad (D5)$$

APPENDIX E—MPO FOR UNITARY MAPS

Any unitary quantum circuit can be decomposed into single-qubit and two-qubit unitary gates. Moreover, one can restrict the set of two-qubit unitary gates to a single cnot gate given by the unitary operator $U_{cnot}=00\otimes I+11\otimes\sigma_x$. In the circuit implementation of quantum computation, one can therefore regard a single circuit layer consisting of either single-qubit gates or the cnot gate $U_{cnot}^{[m_1,m_2]}$ acting on qubits $m_1$ and $m_2$ in the register of N qubits.

Consider a layer of single-qubit unitary gates $\{U^{[m]}\}_{m=0}^{N-1}$, where the superscript m indicates the qubit number. Then the unitary map U acting on the density operator of the whole register is $$U = \bigotimes_{m=0}^{N-1} U^{[m]}, \qquad (E1)$$

where $U^{[m]}(\bullet)=U^{[m]}\bullet(U^{[m]})^\dagger$. In the PTM representation, U is an MPO with the trivial bond dimension 1 (the connecting link is a so called dummy index that takes only one value). Physical input and output for each map $U^{[m]}$ have dimension 4 in the PTM representation.

Consider a layer consisting of the cnot gate $U_{cnot}^{[m_1,m_2]}$, where $m_1$ is the controlling qubit and $m_2$ is the controlled one. In general, qubits $m_1$ and $m_2$ can be non-adjacent. Suppose $m_1<m_2$, then the corresponding unitary map for the whole register reads $$\sum_{k=0}^{3} Id^{[0:m_1-1]} \otimes F_k^{[m_1]} \otimes Id^{[m_1+1:m_2-1]} \otimes G_k^{[m_2]} \otimes Id^{[m_2+1:N-1]}, \qquad (E2)$$

where $Id^{[q_1:q_2]}=\bigotimes_{m=q_1}^{q_2} Id^{[m]}$ is the identity transformation for qubits with numbers in the range from $q_1$ to $q_2$, $\{F_k\}_{k=0}^{3}$ and $\{G_k\}_{k=0}^{3}$ are collections of qubit maps whose PTM representation reads $$\mathfrak{F}_0 = \begin{pmatrix} 1 & 0 & 0 & 0 \\ 0 & 0 & 0 & 0 \\ 0 & 0 & 0 & 0 \\ 0 & 0 & 0 & 1 \end{pmatrix}, \mathfrak{E}_0 = \begin{pmatrix} 1 & 0 & 0 & 0 \\ 0 & 1 & 0 & 0 \\ 0 & 0 & 0 & 0 \\ 0 & 0 & 0 & 0 \end{pmatrix}, \qquad (E3)$$

$$\mathfrak{F}_1 = \begin{pmatrix} 0 & 0 & 0 & 1 \\ 0 & 0 & 0 & 0 \\ 0 & 0 & 0 & 0 \\ 1 & 0 & 0 & 0 \end{pmatrix}, \mathfrak{E}_1 = \begin{pmatrix} 0 & 0 & 0 & 0 \\ 0 & 0 & 0 & 0 \\ 0 & 0 & 1 & 0 \\ 0 & 0 & 0 & 1 \end{pmatrix}, \qquad (E4)$$

$$\mathfrak{F}_2 = \begin{pmatrix} 0 & 0 & 0 & 0 \\ 0 & 1 & 0 & 0 \\ 0 & 0 & 1 & 0 \\ 0 & 0 & 0 & 0 \end{pmatrix}, \mathfrak{E}_2 = \begin{pmatrix} 0 & 1 & 0 & 0 \\ 1 & 0 & 0 & 0 \\ 0 & 0 & 0 & 0 \\ 0 & 0 & 0 & 0 \end{pmatrix}, \qquad (E5)$$

$$\mathfrak{F}_3 = \begin{pmatrix} 0 & 0 & 0 & 0 \\ 0 & 0 & 1 & 0 \\ 0 & -1 & 0 & 0 \\ 0 & 0 & 0 & 0 \end{pmatrix}, \mathfrak{E}_3 = \begin{pmatrix} 0 & 0 & 0 & 0 \\ 0 & 0 & 0 & 0 \\ 0 & 0 & 0 & 1 \\ 0 & 0 & -1 & 0 \end{pmatrix}. \qquad (E6)$$

In the PTM representation, the unitary map (16) is given by the MPO with a varying bond dimension: the bond dimension equals 1 (dummy index) for links between qubits O and $m_1$, $m_2$ and N−1; other links have bond dimension 4. The final MPO for (16) in the PTM representation is $$\sum_{a_0,\ldots,a_{N-2}} \mathfrak{E}_{a_0}^{[0]} \otimes \mathfrak{E}_{a_0 a_1}^{[1]} \otimes \ldots \otimes \mathfrak{E}_{a_{N-3} a_{N-2}}^{[N-2]} \otimes \mathfrak{E}_{a_{N-2}}^{[N-1]}, \qquad (E7)$$

where $a_0= \ldots =a_{m_1-1}=a_{m_2}= \ldots =a_{N-2}=0$ (dummy indices) and $\mathfrak{E}_{00}^{[m_1-1]} = \ldots = \mathfrak{E}_{00}^{[m_2+1]} = \mathfrak{E}_{00}^{[m_2+1]} = \ldots = \mathfrak{E}_{0}^{[N-1]} = I_{4\times 4}$ for the corresponding qubits; $a_{m_1}= \ldots =a_{m_2-1}\in\{0,1,2,3\}$ and for the cnot-involved qubits $m_1$ and $m_2$ one has $$\mathfrak{E}_{0 a_{m_1}}^{[m_1]} = F_{a_{m_1}}$$

and $$\mathfrak{E}^{[m_2]}_{a_{m_1-1}0} = \mathfrak{E}_{a_{m_2-1}},$$

whereas for the intermediate qubits q in the range from $m_1+1$ to $m_2-1$ one has $\mathfrak{E}^{[q]}_{a_{q-1}a_q} = \delta_{\alpha_{q-1}\alpha_q} I_{4\times 4}$.

If the circuit is composed of k-local unitary gates other than cnot, then the PTM representation of the corresponding unitary maps can be routinely transformed into an MPO by using a general decomposition procedure, e.g., the singular value decomposition (SVD). In general, this method takes some rectangular matrix A of shape (n×p), and decomposes it into $A_{n\times p} = U_{n\times n}\Sigma_{n\times p}V_{p\times p}^\dagger$ where the columns of U are the left singular vectors, $\Sigma$ has the singular values of A along its diagonal, and $V^\dagger$ has rows that are the right singular vectors. Let us illustrate this with a 2-local unitary map with the PTM representation $\mathfrak{A}^{(i_1,i_2)}_{(o_1,o_2)}$, where $(i_1, i_2)$ are input indices and $(o_1, o_2)$ are output indices corresponding to qubits 1 and 2.

Reordering the indices of $\mathfrak{A}^{(i_1,i_2)}_{(o_1,o_2)}$ to give $\mathfrak{A}^{(i_1,o_1)}_{(i_2,o_2)}$, and then performing the SVD with respect to multiindices $(i_1, o_1)$ on one side and $(i_2, o_2)$ on the other side, results in $\mathfrak{A}^{(i_1,o_1)}_{(i_2,o_2)} = U_\mu^{(i_1,o_1)}\Sigma_\mu^{\mu'}(V^\dagger)_{(i_2,o_2)}^{\mu'}$ with individual tensors $U_\mu^{(i_1,o_1)}$ and $\Sigma_\mu^{\mu'}(V^\dagger)_{(i_2,o_2)}^{\mu'}$ on each qubit connected by some index μ. The bond dimension {μ} does not exceed 16 in this case. After performing this decomposition on each 2-local map, there is a tensor network with connecting links between single-qubit maps, i.e., the MPO form for each unitary layer in the circuit. A generalization of this method to k-local unitary gates involves k−1 decompositions and follows the lines of constructing the MPO for a given operator.

Generally, to allow for the fact that the whole circuit may be relatively deep, it can be segmented into individual subcircuits of shallow depth, where each subcircuit admits a small number of gates. After each k-local unitary map in the circuit is decomposed, the MPO form appears naturally by contracting any 'horizontal' index with respect to the direction of the circuit. In the implementation, the subcircuits consist of individual layers (single qubit gates or non-overlapping cnot gates), and each such layer is transformed into a simple MPO in the PTM representation (with bond dimension 1 or 4) as described above in this section.

APPENDIX F—NOISE INVERSION MAP AND ITS MPO FORM

As a consequence of noise, the true physical implementation of each unitary map $\mathcal{U}$ is some noisy quantum channel $\mathcal{E} \equiv \mathcal{N} \circ \mathcal{U} \neq \mathcal{U}$. Suppose this noisy channel is fully characterised with a reasonable accuracy, e.g., via the process tomography. Then the noisy map $\mathcal{N} = \mathcal{E} \circ \mathcal{U}^{-1}$. If the gate is implemented with a high fidelity, then $\mathcal{E} \approx \mathcal{U}$ and $\mathcal{N} \approx \mathrm{Id}$. Due to the latter fact, $\mathcal{N}^{-1}$ is always well defined whenever the noise level reasonably small. In the PTM representation, the inverse noise map is defined by the matrix $\mathfrak{N}^{-1} = \mathfrak{U}\mathfrak{E}^{-1}$. Assuming the gates act locally on a few qubits, all the matrix operations are readily implementable. The map $\mathcal{N}^{-1}$ is then represented in the MPO form in full analogy with unitary maps (see Appendix E). Sections F2 and F2 show that the MPO has bond dimension 2 in the case of depolarizing noise. Sec. F3 considers a general Pauli qubit noise affecting 2 qubits and shows that the corresponding MPO has bond dimension 4.

In actual hardware, noise affects not only qubits subjected to a local unitary gate. Nearby qubits are vulnerable to the unavoidable cross-talk. Additionally, idle qubits decohere too. Therefore, a more general noise model should take those effects into account. On the other hand, the model should be scalable and avoid the exponentially heavy tomography. A recently studied sparse Pauli-Lindblad model provides an effective noise description in actual devices exploiting the randomized compiling. In the case of the linear topology for an N-qubit register, the model contains 12N−9 parameters [3N of which describe single-qubit decoherence rates and 9(N−1) are associated with the nearest-qubit cross-talk decoherence rates]. The parameters can be learned with the near-constant learning cost in N. Sec. F4 constructs a concise tensor network description for that model in terms of the MPO with the bond dimension 4.

1. 2-Qubit Depolarizing Noise

Let the noisy map $\mathcal{N}$ be a two-qubit depolarizing map with the noise intensity $$\mathcal{N}[\varrho] = (1-\epsilon)\varrho + \epsilon tr[\varrho]\frac{1}{4}I_{4\times 4}. \quad (F1)$$

Then the noise-inversion map reads $$\mathcal{N}^{-1}[\varrho] = \frac{1}{1-\epsilon}\varrho - \frac{\epsilon}{1-\epsilon}tr[\varrho]\frac{1}{4}I_{4\times 4}.$$

The map $\mathcal{N}^{-1}$ has the interquibit bond dimension 2 is $\epsilon\in(0,1)$. This follows from the fact that $\mathcal{N}^{-1} = \mathcal{F}_0 \otimes \mathcal{G}_0 + \mathcal{F}_1 \otimes \mathcal{G}_1$, where $\mathcal{F}_0 = \mathcal{G}_0 = (1-\epsilon)^{-1/2}\mathrm{Id}$ is a rescaled identity map for a single qubit and $$\mathcal{F}_1[\bullet] = -\mathcal{G}_1[\bullet] = \sqrt{\epsilon(1-\epsilon)^{-1}} tr[\bullet]\frac{1}{2}I_{2\times 2}.$$

Reshaping the 16×16 PTM representation $$(R^{-1})^{(i_1,i_2)}_{(o_1,o_2)}$$

for the map $\mathrm{N}^{-1}$ into $(\mathfrak{N}^{-1})_{(i_2,o_2)}^{(i_1,o_1)}$ where $(i_m, o_m)$ is the input-output multiindex for the mth qubit explicitly finds nonzero singular values with respect to the interqubit link:

$$\sum\nolimits_0^0 = \frac{\sqrt{16-2\epsilon+\epsilon^2}+(4-\epsilon)\sqrt{16+4\epsilon+\epsilon^2}}{\sqrt{2}(1-\epsilon)} \approx 4\left(1+\frac{15\epsilon}{16}\right), \quad (F2)$$

$$\sum\nolimits_1^1 = \frac{\sqrt{16-2\epsilon+\epsilon^2}-(4-\epsilon)\sqrt{16+4\epsilon+\epsilon^2}}{\sqrt{2}(1-\epsilon)} \approx \frac{3\epsilon}{4}. \quad (F3)$$

If $\epsilon=0$, then $\mathcal{N}^{-1}=\mathrm{Id}$ leaves the only nonzero singular value $\Sigma_0^0=4$. Deviation of this singular value from 1 is not surprising decomposing the map with respect to qubits $[(i_1, o_1)$, not with respect to input and output $[(i_1, i_2)$ vs $(o_1, o_2)]$. The physical meaning of the leading singular value (23) becomes clear considering the energy functional $tr[\mathcal{N}^{-1}[\varrho]H]=tr[\varrho\mathcal{N}^{-1}[H]]$. The Pauli string expansion for $H=\Sigma_l c_l P_l$ after application of the noise-inversion map $\mathcal{N}^{-1}$ takes the form $\mathcal{N}^{-1}[H]=\Sigma_l c_l' P_l$, where $c_l'=c_l$ if the noise-affected substring of $P_l$ equals $I\otimes I$, $c_l'=(1-\epsilon)^{-1}c_l$ if the noise-affected substring of $P_l$ differs from $I\otimes I$ (15 different possibilities: $I\otimes X, \ldots, Z\otimes Z$). If all Pauli strings have similar contributions to the Hamiltonian and appear with the same frequency, then on average $$c_l' \approx \left(\frac{1}{16}\times 1 + \frac{15}{16}\times (1-\epsilon)^{-1}\right)c_l \approx \left(1+\frac{15\epsilon}{16}\right)c_l.$$

These arguments are directly applicable to the estimation of the measurement overhead (see Appendix I).

2. Global Depolarizing Noise $\mathcal{N}$

Suppose the noisy map N is an N-qubit global depolarizing channel with the noise intensity $\epsilon$, i.e., $$N[\varrho] = (1-\epsilon)\varrho + \epsilon tr[\varrho]\frac{1}{2^N}I_{2^N\times 2^N}.$$

Then the noise-inversion map reads $$\mathcal{N}^{-1}[\varrho] = \frac{1}{1-\epsilon}\varrho - \frac{\epsilon}{1-\epsilon}tr[\varrho]\frac{1}{2^N}I_{2^N\times 2^N}.$$

The map $\mathcal{N}^{-1}$ has the bond dimension 2 if $\epsilon \in (0,1)$ because $\mathcal{N}^{-1} = \mathcal{F}_0^{\otimes N} + \mathcal{F}_1^{\otimes N}$, where $\mathcal{F}_0 = (1-\epsilon)^{-1/N}\mathrm{Id}$ is a rescaled identity map for a single qubit and $$\mathcal{F}_1[\bullet] = \left[-\epsilon(1-\epsilon)^{-1}\right]^{1/N} tr[\bullet]\frac{1}{2}I_{2\times 2}.$$

In the MPO for $\mathcal{N}^{-1}$, nonzero contributions are only those where the virtual indices are either all equal to 0 or all equal to 1 (like in the matrix product representation for the Greenberger-Horne-Zeilinger state).

If only global depolarizing noise is present in the quantum circuit, then the calculation of the noise mitigation map is trivial because $\mathcal{N}^{-1}$ commutes with any unitary operation U. In the case of L noisy layers:

$$M[\varrho] = \mathcal{N}^{-L}[\varrho]$$
$$= \frac{1}{(1-\epsilon)^L}\varrho + \left(1-\frac{1}{(1-\epsilon)^L}\right)tr[\varrho]\frac{1}{2^N}I_{2^N\times 2^N},$$

so M also has the bond dimension 2. Therefore, the bond dimension $\chi_{max}=2$ suffices to fully mitigate the global depolarizing noise without any compression error.

3. 2-Qubit Pauli Noise

Let the noisy map $\mathcal{N}$ be a two-qubit Pauli channel. In the PTM representation, $\mathfrak{N} = \mathrm{diag}(1, \varkappa_{01}, \ldots, \varkappa_{33})$, where 15 real parameters $\varkappa_{ij}$ define the scaling coefficients for the operators $\sigma_i\otimes\sigma_j$. Assuming the noise intensity is relatively small, $\varkappa_{ij}=1-\epsilon_{ij}$, where $0\leq\epsilon_{ij}\ll 1$. The inverse map $\mathcal{N}^{-1}$ generally has the interqubit bond dimension 4 because the PTM representation $\mathfrak{N}^{-1}=\mathrm{diag}(1, \varkappa_{01}^{-1}, \ldots, \varkappa_{33}^{-1})$ adopts the decomposition $\mathfrak{N}^{-1}=\Sigma_{i=0}^3 \mathfrak{F}_i\otimes\mathfrak{G}_i$, where $\mathfrak{F}_i=\mathrm{diag}(\delta_{i0}, \delta_{i1}, \delta_{i2}, \delta_{i3})$ and $\mathfrak{G}_i=\mathrm{diag}(\varkappa_{i0}^{-1}, \varkappa_{i1}^{-1},$ $\varkappa_{i2}^{-1}, \varkappa_{i3}^{-1})$. Reshaping the 16×16 PTM representation $(\mathfrak{N}^{-1})_{(o_1,o_2)}^{(i_1,i_2)}$ for the map $\mathcal{N}^{-1}$ into $(\mathfrak{N}^{-1})_{(i_2,i_2)}^{(i_1,o_1)}$, where $(i_m, o_m)$ is the input-output multiindex for the mth qubit, one can explicitly find nonzero singular values with respect to the interqubit link. The largest singular value in the first order of the error parameters reads $$\sum\nolimits_0^0 \approx 4\left(1+\frac{1}{16}\sum\nolimits_{ij}\epsilon_{ij}\right). \tag{F4}$$

Similarly to the case of depolarizing noise, one can interpret the quarter of this singular value as the average multiplicative factor in estimating a typical observable. To recapitulate, the functional $tr[\mathcal{N}^{-1}[\varrho]H]=tr[\varrho\mathcal{N}^{-1}[H]]$ is considered for the observable H. The Pauli string expansion for $H=\Sigma_l P_l$ after application of the noise-inversion map $\mathcal{N}^{-1}$ takes the form $\mathcal{N}^{-1}[H]=\Sigma_l c_l' P_l$, where $c_l'=(1-\epsilon_{ij})^{-1}c_l$ if the noise-affected substring of $P_l$ equals $\sigma_i\otimes\sigma_j$. If all Pauli strings have similar contributions to the observable H and appear with the same frequency, then on average $$c_l' \approx \left(1+\frac{1}{16}\sum\nolimits_{ij}\epsilon_{ij}\right)c_l.$$

These arguments are again directly applicable to the estimation of the measurement overhead (see Appendix I).

FIG. 6 illustrates a MPO construction for the inverse of the sparse Pauli-Lindblad noise model (linear topology with the nearest neighbour cross-talk). Single-qubit maps and two-qubit maps in Eq. (F7) commute. Each of the two-qubit maps adopts a decomposition with the bond dimension.

4. Sparse Pauli-Lindblad Noise Model

Consider an N-qubit Pauli string $\sigma_\alpha = \otimes_{m=0}^{N-1}\sigma_{\alpha_m}$ as a jump operator in the Lindblad superoperator $L_\alpha(\bullet) = \lambda_\alpha(\sigma_\alpha\bullet\sigma_\alpha - \bullet)$ with the rate $\lambda_\alpha \geq 0$. Note that these Lindblad superoperators commute, i.e., $L_\alpha(L_\beta(\bullet)) = L_\beta(L_\alpha(\bullet))$. This implies the Pauli channel expansion $$N \equiv \exp\left(\sum\nolimits_\alpha L_\alpha\right) = \bigcirc_\alpha e^{L_\alpha}. \tag{F5}$$

The expansion is particularly useful in the case of the local noise, for which each map $e^{L_\alpha}$ acts trivially on all but potentially a few adjacent qubits. Restricting to the single- and two-qubit local maps gets the sparse model with $3N+9(N-1)$ potentially nonzero parameters $\lambda_\alpha$. One regroups the maps $e^{L_\alpha}$ according to the location of their nontrivial action, namely, $$N = \left(\prod\nolimits_{m=0}^{N-1} N^{[m]}\right)\circ\left(\prod\nolimits_{m=0}^{N-2} N^{[m,m+1]}\right), \tag{F6}$$

where $$N^{[m]} = \exp\left(\sum\nolimits_{\alpha_m=1}^3 L_{(0,\ldots,0,\alpha_m,0,\ldots,0)}\right),$$

$$N^{[m,m+1]} = \exp\left(\sum\nolimits_{\alpha_m,\alpha_{m+1}=1}^3 L_{(0,\ldots,0,\alpha_m,\alpha_{m+1},0,\ldots,0)}\right).$$

$N^{[m]}$ acts nontrivially at the mth qubit only, so in what follows it will be considered as the single-qubit map with 3 parameters $\{\lambda_i^{[m]}\}_{i=1}^3$. $N^{[m,m+1]}$ acts nontrivially at the mth and (m+1)st qubits only, so in what follows it will be considered as the two-qubit map with 9 parameters $\{\lambda_{ij}^{[m]}\}_{i,j=1}^3$. The straightforward calculation yields the diagonal PTM representation for each of the maps, namely, $\mathfrak{N}^{[m]}=\mathrm{diag}(1, \varkappa_1^{[m]}, \varkappa_2^{[m]}, \varkappa_3^{[m]})$ and $\mathfrak{N}^{[m,m+1]}=\mathrm{diag}(1, \varkappa_{11}^{[m]}, \ldots, \varkappa_{33}^{[m]})$ with $$\kappa_1^{[m]} = \exp(-2(\lambda_2^{[m]} + \lambda_3^{[m]})),$$

$$\kappa_2^{[m]} = \exp(-2(\lambda_3^{[m]} + \lambda_1^{[m]})),$$

$$\kappa_3^{[m]} = \exp(-2(\lambda_1^{[m]} + \lambda_2^{[m]})),$$

$$\kappa_{01}^{[m]} = \exp(-2(\lambda_{12}^{[m]} + \lambda_{13}^{[m]} + \lambda_{22}^{[m]} + \lambda_{23}^{[m]} + \lambda_{32}^{[m]} + \lambda_{33}^{[m]})),$$

$$\kappa_{02}^{[m]} = \exp(-2(\lambda_{11}^{[m]} + \lambda_{13}^{[m]} + \lambda_{21}^{[m]} + \lambda_{23}^{[m]} + \lambda_{31}^{[m]} + \lambda_{33}^{[m]})),$$

$$\kappa_{03}^{[m]} = \exp(-2(\lambda_{11}^{[m]} + \lambda_{12}^{[m]} + \lambda_{21}^{[m]} + \lambda_{22}^{[m]} + \lambda_{31}^{[m]} + \lambda_{32}^{[m]})),$$

$$\kappa_{10}^{[m]} = \exp(-2(\lambda_{21}^{[m]} + \lambda_{22}^{[m]} + \lambda_{23}^{[m]} + \lambda_{31}^{[m]} + \lambda_{32}^{[m]} + \lambda_{33}^{[m]})),$$

$$\kappa_{11}^{[m]} = \exp(-2(\lambda_{12}^{[m]} + \lambda_{13}^{[m]} + \lambda_{21}^{[m]} + \lambda_{31}^{[m]})),$$

$$\kappa_{12}^{[m]} = \exp(-2(\lambda_{11}^{[m]} + \lambda_{13}^{[m]} + \lambda_{22}^{[m]} + \lambda_{32}^{[m]})),$$

$$\kappa_{13}^{[m]} = \exp(-2(\lambda_{11}^{[m]} + \lambda_{12}^{[m]} + \lambda_{23}^{[m]} + \lambda_{33}^{[m]})),$$

$$\kappa_{20}^{[m]} = \exp(-2(\lambda_{11}^{[m]} + \lambda_{12}^{[m]} + \lambda_{13}^{[m]} + \lambda_{31}^{[m]} + \lambda_{32}^{[m]} + \lambda_{33}^{[m]})),$$

$$\kappa_{21}^{[m]} = \exp(-2(\lambda_{11}^{[m]} + \lambda_{22}^{[m]} + \lambda_{23}^{[m]} + \lambda_{31}^{[m]})),$$

$$\kappa_{22}^{[m]} = \exp(-2(\lambda_{12}^{[m]} + \lambda_{21}^{[m]} + \lambda_{23}^{[m]} + \lambda_{32}^{[m]})),$$

$$\kappa_{23}^{[m]} = \exp(-2(\lambda_{13}^{[m]} + \lambda_{21}^{[m]} + \lambda_{22}^{[m]} + \lambda_{33}^{[m]})),$$

$$\kappa_{30}^{[m]} = \exp(-2(\lambda_{11}^{[m]} + \lambda_{12}^{[m]} + \lambda_{13}^{[m]} + \lambda_{21}^{[m]} + \lambda_{22}^{[m]} + \lambda_{23}^{[m]})),$$

$$\kappa_{31}^{[m]} = \exp(-2(\lambda_{11}^{[m]} + \lambda_{21}^{[m]} + \lambda_{32}^{[m]} + \lambda_{33}^{[m]})),$$

$$\kappa_{32}^{[m]} = \exp(-2(\lambda_{12}^{[m]} + \lambda_{22}^{[m]} + \lambda_{31}^{[m]} + \lambda_{33}^{[m]})),$$

$$\kappa_{33}^{[m]} = \exp(-2(\lambda_{13}^{[m]} + \lambda_{23}^{[m]} + \lambda_{31}^{[m]} + \lambda_{32}^{[m]})).$$

The inverse map $$N^{-1} = \left(\prod_{m=0}^{N-1}(N^{[m]})^{-1}\right) \circ \left(\prod_{m=0}^{N-2}(N^{[m,m+1]})^{-1}\right) \quad (\text{F7})$$

is obtained from N by changing sign of all $\lambda$-parameters. Commutativity of maps $(N^{[m,m+1]})^{-1}$ makes it possible to consider $\Pi_{m=0}^{N-2}(N^{[m,m+1]})^{-1}$ as a single brick-wall layer $\Pi_m$ is even $(N^{[m,m+1]})^{-1} \circ \Pi_m$ is odd $(N^{[m,m+1]})^{-1}$. Each map $(N^{[m,m+1]})^{-1}$ is a two-qubit Pauli map adopting an MPG form $(N^{[m,m+1]})^{-1} = \Sigma_{\alpha_{m+1}}^3 F_{\alpha_{m+1}}^{[m]} \otimes G_{\alpha_{m+1}}^{[m+1]}$ with the bond dimension 4 (see Sec. F3). Merging single-qubit maps into $A_{\alpha_m,\alpha_{m+1}}^{[m]} = (N^{[m]})^{-1} \circ G_{\alpha_m}^{[m]} \circ F_{\alpha_{m+1}}^{[m]}$, gets the MPG representation $$N^{-1} = \sum_{a_0,\ldots,a_{N-2}=0}^{3} A_{a_0}^{[0]} \otimes A_{a_0 a_1}^{[1]} \otimes \ldots \otimes A_{a_{N-3} a_{N-2}}^{[N-2]} \otimes A_{a_{N-2}}^{[N-1]} \quad (\text{F8})$$

with the bond dimension $\chi_n = 4$ (see FIG. 4 for the graphical explanation of the MPG construction).

APPENDIX G—NOISE MITIGATION MAP AS AN MPG

This section is devoted to details behind the iterative construction of the noise mitigation map via Eq. (1). The multiplication and compression of MPs are implemented in popular computation packages, e.g., in Quimb, but are reviewed here for the sake of completeness.

1 Multiplication of MPOs

Multiplying two matrix product operators for N subsystems $$\mathfrak{A} = \sum_{a_0,\ldots,a_{N-2}} \mathfrak{A}_{a_0}^{[0]} \otimes \mathfrak{A}_{a_0 a_1}^{[1]} \otimes \ldots \otimes \mathfrak{A}_{a_{N-3} a_{N-2}}^{[N-2]} \otimes \mathfrak{A}_{a_{N-2}}^{[N-1]}$$

$$\mathfrak{B} = \sum_{b_0,\ldots,b_{N-2}} \mathfrak{B}_{b_0}^{[0]} \otimes \mathfrak{B}_{b_0 b_1}^{[1]} \otimes \ldots \otimes \mathfrak{B}_{b_{N-3} b_{N-2}}^{[N-2]} \otimes \mathfrak{B}_{b_{N-2}}^{[N-1]},$$

gets another operator $\mathfrak{C} = \mathfrak{A}\mathfrak{B}$ in the MPO form $$\mathfrak{C} = \sum_{c_0,\ldots,c_{N-2}} \mathfrak{C}_{c_0}^{[0]} \otimes \mathfrak{C}_{c_0 c_1}^{[1]} \otimes \ldots \otimes \mathfrak{C}_{c_{N-3} c_{N-2}}^{[N-2]} \otimes \mathfrak{C}_{c_{N-2}}^{[N-1]}, \quad (\text{G1})$$

where the virtual index $c_m = (a_m, b_m)$ is the multiindex composed of virtual indices $a_m$ and $b_m$ so that the bond dimension $|\{c_m\}| = |\{a_m\}| \circ |\{b_m\}|$, and the operator $$\mathfrak{C}_{c_{m-1} c_m}^{[m]} = \mathfrak{A}_{a_{m-1} a_m}^{[m]} \mathfrak{B}_{b_{m-1} b_m}^{[m]}.$$

MPO Compression

Suppose there is an MPO $\mathfrak{A}$ with bond dimension $\chi$ for N subsystems and one wants to approximate it by another MPO $\mathfrak{B}$ with a smaller bond dimension $\chi_{max}$. Then the standard procedure would be to bring $\mathfrak{A}$ to a canonical form and leave the most contributing $\chi_{max}$ singular values $\{\lambda_i\}_{i=0}^{\chi_{max}-1}$ in each bond or to variationally find fixed-size tensors in $\mathfrak{B}$ by maximizing the normalized Hilbert-Schmidt scalar product for $\mathfrak{A}$ and $\mathfrak{B}$. In both cases, the compression error can be quantified by the Frobenius norm $\|\mathfrak{A} - \mathfrak{B}\|_2$ (equivalent to the Hilbert-Schmidt norm and the Schatten 2-norm in a finite dimensional case). In the singular-value-truncation method, the upper bound is known, namely, $\|\mathfrak{A} - \mathfrak{B}\|_2^2 \leq 2\Sigma_{bonds} \Sigma_{i=max}^{\chi-1} \lambda_i^2$. However in both cases the compression error can be calculated as $\|\mathfrak{A} - \mathfrak{B}\|_2^2 = \mathrm{tr}[\mathfrak{A}^2] + \mathrm{tr}[\mathfrak{B}^2] - 2\mathrm{Re}(\mathrm{tr}[\mathfrak{A}^\dagger \mathfrak{B}])$.

Construction of the noise-mitigation map M via iterative applications of Eq. (1) assumes that ith iteration map $M^{(i)}$ is compressed down to bond dimension $\chi_{max}$ if the actual bond dimension exceeds this value. Since the norm respects the triangle inequality, one upper bounds the total error in the final compressed MPO $\mathfrak{M}_{compr.}$ for M by $$\|\mathfrak{M}_{compr.} - \mathfrak{M}_{exact}\|_2 \leq \sum_{i=1}^{L} \|\mathfrak{M}_{compr.}^{(i)} - \mathfrak{M}_{exact}^{(i)}\|_2, \quad (\text{G2})$$

where L is the circuit depth.

Let r be the PTM representation for the quasistate (Appendix 8.1), $\mathfrak{h}$ be the PTM representation for the Hamiltonian H (Appendix 8.2). The noisy energy estimate is $H_{noisy} = \mathfrak{r}^\dagger \mathfrak{M} \mathfrak{h}$ and the noise mitigated value is $\overline{H}_{n.m.} = \mathfrak{r}^\dagger \mathfrak{M} \mathfrak{h}$. The compression error results in the energy estimate error $\Delta_{compr.} \overline{H}_{n.m.}$ that can be bounded from above as follows:

$$\Delta_{compr.} \overline{H}_{n.m.} = \quad (\text{G3})$$

$$|\mathfrak{r}^\dagger (\mathfrak{M}_{compr.} - \mathfrak{M}_{exact}) \mathfrak{h}| \leq |\mathfrak{r}| \cdot \|(\mathfrak{M}_{compr.} - \mathfrak{M}_{exact})\| \cdot |\mathfrak{h}| \leq$$

$$|\mathfrak{r}| \cdot \|(\mathfrak{M}_{compr.} - \mathfrak{M}_{exact})\|_2 \cdot |\mathfrak{h}| \leq |\mathfrak{r}| \cdot |\mathfrak{h}| \cdot \sum_{i=1}^{L} \|\mathfrak{M}_{compr.}^{(i)} - \mathfrak{M}_{exact}^{(i)}\|_2,$$

where $\|\cdot\| = \|\cdot\|_\infty$ is the conventional operator norm (the Schatten $\infty$-norm). The N qubit Hamiltonian $H = \Sigma_l c_l P_l$ has $\|\mathfrak{h}\|=\sqrt{2^N \Sigma_i c_i^2}$. Note that $|\mathfrak{r}|^2 = \mathrm{tr}[\varrho^2]$ is the quasistate purity parameter which continuously decreases with the increase of L if the noise is unital. For example, if the noisy maps are two-qubit Pauli channels as in Sec. F.3 and different Pauli strings appear in $\varrho$ with the same frequency, then $$|\mathfrak{r}| \approx \left(1 - \frac{1}{16}\sum_{ij}\epsilon_{ij}\right)^{\#noisy\ channels}.$$

This behaviour partially compensates the growth of the norm $\|\mathfrak{M}_{compr.} - \mathfrak{M}_{exact}\|_2\|$. In fact, the operator $\mathfrak{M}_{exact}$ expands the space of generalized Bloch vectors for $\varrho$ in exactly the opposite way and $$\|\mathfrak{M}_{exact}\|_2 \propto \left(1 + \frac{1}{16}\sum_{ij}\epsilon_{ij}\right)^{\#noisy\ channels}$$

in Sec. F3. However, the upper bound (32) is usually too loose in practice because of the drastic difference between the conventional operator norm $\|\cdot\|$ and the Frobenius norm $\|\cdot\|_2$ (the transition from the former one to the latter one was used in derivation of inequality (32)). For example, the identity transformation Id for N qubits in the PTM form is the $4^N \times 4^N$ identity matrix $\mathfrak{I}$ for which $\|\mathfrak{I}\|=1$ whereas $\|\mathfrak{I}\|_2=2^N$. A heuristic normalization is typically used to get a reasonable error scaling. A division by $\|\mathfrak{M}_{exact}\|_2$ gets rid of $|\mathfrak{r}|$ on one hand and amends the overestimation of the operator norm on the other hand. A heuristic error estimate is obtained as follows $$\Delta_{compr.}\overline{H}_{n.m.} \sim |\mathfrak{h}| \cdot \sum_{i=1}^{L} \frac{\|\mathfrak{M}_{commr.}^{(i)} - \mathfrak{M}_{exact}^{(i)}\|_2}{\|\mathfrak{M}_{exact}^{(i)}\|_2}. \qquad (G4)$$

APPENDIX H—DISTRIBUTION OF MPO SINGULAR VALUES

FIG. 7 depicts typical singular values in the central link for the MPO M (arranged in the decreasing order). There is one leading singular value (~1) and a plateau of singular values that are of the first order in the noise intensity (~$\epsilon$). Singular values exhibit transitions to higher orders in the noise intensity (~$\epsilon^2$).

APPENDIX I—MEASUREMENT OVERHEAD

In the proposed noise mitigation strategy, the resulting estimation error $\Delta \overline{O}_{n.m.}$ is greater than the noisy estimation $\Delta \overline{O}_{noisy}$ due to the presence of inverse maps $N^{-1}$ in $\mathcal{M}$. These inverse maps expand the state space (in the generalized PTM representation for N-qubit states) and govern the mixed density operator o at the noisy circuit output to a pure state $\Psi\Psi$ that the corresponding noiseless circuit would produce. FIG. 6 pictorially explains this effect at the level of states; however, the relation between $\Delta \overline{O}_{n.m.}$ and $\Delta \overline{O}_{noisy}$ depends not only on the noisy density operator $\varrho$ and the noisy circuit but also on the observable O. For example, if O is close to the identity operator and the noise is unital, then $\Delta \overline{O}_{n.m.} = \Delta \overline{O}_{noisy}$ manifesting no measurement overhead.

FIG. 8 illustrates a pictorial representation of the generalized Bloch ball transformation due to noise and noise inversion. The estimation error (black box in the middle) is amplified by the noise mitigation map.

To make the last argument clearer and benchmark against the PEC measurement overhead, let us consider an example of the single-qubit depolarizing noise $$N[\varrho] = (1-\epsilon)\varrho + \epsilon tr[\varrho]\frac{1}{2}I.$$

The Kraus-like representation of the inverse map (which is neither completely positive nor positive if $\epsilon > 0$) reads $$N^{-1}(\varrho) \approx \left(1 + \frac{3\epsilon}{4}\right)\varrho - \frac{\epsilon}{4}(X\varrho X + Y\varrho Y + Z\varrho Z),$$

where $(X, Y, Z) \equiv (\sigma_1, \sigma_2, \sigma_3)$. In the PEC, $N^{-1}$ is simulated by sampling Pauli gates I, X, Y, Z from the quasiprobability $$\left(1 + \frac{3\epsilon}{4}, -\frac{\epsilon}{4}, -\frac{\epsilon}{4}, -\frac{\epsilon}{4}\right),$$

which implies sampling from the actual probability distribution $$\gamma_{PEC}^{-1} \times \left(1 + \frac{3\epsilon}{4}, \frac{\epsilon}{4}, \frac{\epsilon}{4}, \frac{\epsilon}{4}\right)$$

with the overhead $$\gamma_{PEC} \approx 1 + \frac{3\epsilon}{2}.$$

One can see two different contributions to $\gamma_{PEC}$: one originates from the amplifying factor $$1 + \frac{3\epsilon}{4}$$

and the other one accounts for negativities in the quasiprobability $$\left(3 \times \frac{\epsilon}{4}\right).$$

In the TNB noise mitigation, the map $N^{-1}$ is applied as a mathematical map in the classical postprocessing. To estimate the overhead in this case, one may formally consider the evolution of an observable O in the Heisenberg picture $(\mathcal{N}^{-1})^\dagger = \mathcal{N}^{-1}$ (though the map $N^{-1}$ is not completely positive). If O is one of the Pauli operators, then $$\mathcal{N}^{-1}[I] = I,$$

$$\mathcal{N}^{-1}[(X, Y, Z)] = \frac{1}{1-\epsilon}(X, Y, Z) \approx (1+\epsilon) \times (X, Y, Z).$$

The measurement overhead in this case $\gamma_{TNB} \approx 1+\epsilon <\gamma_{PEC}$. If O has same-order contributions from all Pauli operators, then the averaged measurement overhead is $$\gamma_{TNB} \approx \frac{1}{4} \times 1 + \frac{3}{4} \times (1+\epsilon) = 1 + \frac{3\epsilon}{4} \approx \sqrt{\gamma_{PEC}}. \tag{I1}$$

In the TNB noise mitigation, there is only one contribution to $\gamma_{TNB}$ associated with the amplification factor.

The same line of reasoning is applicable to the 2-qubit depolarizing noise (F1). In this case, the inverse map (F1) takes the form $$\mathcal{N}^{-1}(\varrho) \approx \left(1+\frac{15\epsilon}{16}\right)\rho - \frac{\epsilon}{16}(I \otimes X \varrho I \otimes X + \ldots + Z \otimes Z \varrho Z \otimes Z),$$

the quasiprobability distribution is $$\left(1+\frac{15\epsilon}{16}, -\frac{\epsilon}{16}, \ldots, -\frac{\epsilon}{16}\right) \text{ and } \gamma_{PEC} \approx 1 + \frac{15\epsilon}{8}.$$

On the other hand, in the TNB noise mitigation $$\mathcal{N}^{-1}[I \otimes I] = I \otimes I,$$
$$\mathcal{N}^{-1}[(I \otimes X, \ldots, Z \otimes Z)] \approx (1+\epsilon) \times (I \otimes X, \ldots, Z \otimes Z).$$

If the noise affects 2 of N qubits, then the observable's Pauli substrings (affecting those 2 qubits) are relevant for the measurement overhead analysis. If most of the substrings are identity operators (as it happens for a low-Pauli-weight observable O), then the measurement overhead is negligible (close to 1). Otherwise, if all 16 substrings appear with roughly the same frequency and the same-order coefficients, then the averaged measurement overhead is $$\gamma_{TNB} \approx \frac{1}{16} \times 1 + \frac{15}{16} \times (1+\epsilon) = 1 + \frac{15\epsilon}{16} \approx \sqrt{\gamma_{PEC}}. \tag{I2}$$

If the circuit contains $\#_{noisy}$ 2-qubit depolarizing maps, then the measurement overheads for a typical observable are $$\gamma_{PEC} \approx \left(1+\frac{15\epsilon}{8}\right)^{\#_{noisy}}, \gamma_{TNB} \approx \left(1+\frac{15\epsilon}{16}\right)^{\#_{noisy}}. \tag{I3}$$

Eqs. (I1) and (I2) [altogether with similar calculations for a general 2-qubit Pauli noise (Sec. F.3)] reflect a general square-root relation $\gamma_{TNB} \approx \sqrt{\gamma_{PEC}}$ for typical high-Pauli-weight observables under the Pauli noise (discussed above in Sec. II). The low-Pauli-weight observables enjoy even small measurement overhead, which makes the approach beneficial for estimating two-point correlators (k-local correlators, k<<N) and chemical Hamiltonians (whose Pauli weight generally grows logarithmically in the number of qubits N).

Interestingly, the averaged measurement overhead in the NTB noise mitigation can be inferred from the very noise mitigation map M. Sections F1 and F3 present singular values in the MPO link for the inverse of the 2-qubit depolarizing noise and the 2-qubit Pauli noise, respectively. The largest singular value $\Sigma_0^0$ is an effective amplification factor associated with the identity transformation. Therefore, the measurement overhead in the TNB noise mitigation is readily estimated as the largest singular value in the MPO for M (regularized w.r.t. the singular value of the identity transformation).

APPENDIX J: STABILIZER CIRCUITS

FIG. 9 illustrates stabilizer circuits, according to some embodiments. The top of FIG. 9 illustrates a stabilizer circuit with brick-wall-arranged layers of concurrent cnot gates interleaved with layers of randomly chosen single-qubit Clifford gates. The bottom of FIG. 9 illustrates a noisy version of the stabilizer circuit, where each cnot gate is followed by a two-qubit depolarizing map.

The Gottesman-Knill theorem insures a classically efficient simulation of stabilizer quantum circuits consisting of the Clifford gates. Therefore, the stabilizer circuits serve as a natural testbed for studying scalability of quantum informational protocols (including the noise mitigation of the Clifford errors). The Clifford noise is a bisthochastic quantum channel whose Kraus operators are proportional to the Clifford unitaries, which makes it possible to efficiently simulate the effect of the Clifford noise via probabilistic classical computation. The numerical experiments are aimed at mitigating such a noise in exactly the same way as described in the proposed noise mitigation strategy (see main text).

As the stabilizer circuit, one considers repeated brick-wall-arranged layers of concurrent cnot gates (one starting at even and one at odd locations in the linear qubit register) interleaved with layers of randomly chosen single-qubit Clifford gates (FIG. 9). This enables the fastest propagation of correlations in the circuit. For a fixed number of qubits N and the circuit depth L, the noiseless circuit prepares a generally correlated pure state vector $\Psi$, which is stabilized by all N generating operators $\{g_i\}_{i=0}^{N-1}$ of the stabilizer group, i.e., $g_i\Psi=\Psi$ for all i=0, ..., N. The generators $\{g_i\}_{i=0}^{N-1}$ are the signed Pauli strings themselves and typically have a high Pauli weight (of the order of N) for the circuits constructed. Since eigenvalues of each generator are ±1 and $g_i\Psi=\Psi$ for all i=0, . . . , N, the state $\Psi$ is a non-degenerate ground state of the Hamiltonian $$H = -\frac{1}{N}\sum_{i=0}^{N-1} g_i \tag{J1}$$

and corresponds to the ground state energy $E_0=-1$. Such an interpretation gives the simulation a flavour of the quantum chemical problem addressed by the variational quantum eigensolver], where the quantum circuit is adapted to prepare a ground state of some Hamiltonian H in the form of weigthed Pauli stings.

To get a noisy version of the stabilizer circuit, each cnot gate is followed by a two-qubit depolarizing map N with the noise intensity E (see Sec. F1 for details of the tensor network representation of this noise and FIG. 9). The benefits of simulating such a noise are that it is fully characterized by a single parameter and the total measurement overhead is analytically derived both for PEC and TNB in Eq. (13), where $\#_{noisy}$=(N−1)L/2 is the total number of noisy cnot gates.

Once the noisy circuit prepares the density operator $\varrho$, the qubits are protectively measured in the eigenbasis of one of Pauli operators. To get a nonzero estimation of the constructed observable O=H, the measurement basis for the whole circuit should be aligned with the eigenbasis of at least one generator $g_1$. To get a reasonable estimation of the observable, one performs measurements in eigenbases of all N generators $\{g_i\}_{i=0}^{N-1}$. Other bases can be optionally added for the sake of informational completeness but in this numerical experiment their probability can be made negligibly small as they do not contribute to the estimation of observable [because $(N^{-1})^\dagger(g_i)$ and $U^\dagger(g_i)$ are both diagonal in the eigenbasis of $g_i$ for any Clifford noise N and any Clifford unitary operation U]. To sum up, the noisy circuit is measured in N local bases, with S shots being collected for each basis. A fast simulation of measurement outcomes is possible with the help of the Stim package.

Without the noise mitigation, the estimation $\overline{H}_{noisy}$ gradually increases from $E_0=-1$ to 0 with the increase of the circuit depth L due to the noise accumulation. The estimated standard deviation $\Delta\overline{H}_{noisy}$ is about $$\frac{1}{\sqrt{NS}}$$

and does not depend on L. Application of the noise mitigation map amends the energy estimation and returns it back to the vicinity of $E_0$; however, the standard deviation $\Delta\overline{H}_{n.m.}$ for the noise mitigated value increases. In the numerical experiment, the measurement overhead is the ratio $\gamma=\Delta\overline{H}_{n.m.}/\Delta\overline{H}_{noisy}$. The square $\gamma^2$ quantifies the scaling factor for the number of shots needed to reduce $\Delta\overline{H}_{n.m.}$ down to $\Delta\overline{H}_{noisy}$. Squares of the numerical values $\gamma$ and the theoretical values are compared in FIG. 4 in the main text and there is good agreement between the numerical experiment and the theory.

APPENDIX K—PERTURBATION THEORY FOR THE LOCAL PAULI NOISE IN STABILIZER CIRCUITS

Consider a noisy stabilizer circuit, where each noisy layer N can be decomposed into a concatenation of k-local Pauli channels $N^{[m_1, \ldots, m_k]}$ affecting k qubits only (the qubits $m_1, \ldots, m_k$ do not have to be adjacent). A prominent example of 2-local Pauli noise is the sparse Pauli-Lindblad noise model with the nearest-neighbour cross-talk (Sec. F4). The leading term in each map $N^{[m_1, \ldots, m_k]}$ is the identity transformation, so $N^{[m_1, \ldots, m_k]} = \text{Id} + \epsilon \Lambda^{[m_1, \ldots, m_k]}$, where $\epsilon$ is the noise intensity and $\Lambda$ is a k-local trace-nullifying map adopting a diagonal sum representation $$\Lambda^{[m_1,\ldots,m_k]}(\bullet) = \sum\nolimits_{\alpha_{m_1},\ldots,\alpha_{m_k}=0}^{3} q_{\alpha_{m_1},\ldots,\alpha_{m_k}} \sigma_{\alpha_{m_1},\ldots,\alpha_{m_k}} \bullet \sigma_{\alpha_{m_1},\ldots,\alpha_{m_k}}$$

with at most $4^k$ Kraus-like operators, each being proportional to a weight-k Pauli string $$\sigma_{\alpha_{m_1},\ldots,\alpha_{m_k}} \equiv I \otimes \ldots \otimes I \otimes \sigma_{\alpha_{m_1}} \otimes I \otimes \ldots \otimes I \otimes \sigma_{\alpha_{m_k}} \otimes I \otimes \ldots \otimes I.$$

The follow describes a perturbation theory for the noise mitigation map M with respect to the noise intensity $\epsilon$. The zero-order contribution in M is simply the identity map Id. To find the first-order contribution, one needs to consider a particular map $\Lambda^{[m_1, \ldots, m_k]}$ and fix all other noisy maps to be the identity transformations, then sum over choices for $\Lambda^{[m_1, \ldots, m_k]}$ (see FIG. 7). Suppose $\Lambda^{[m_1, \ldots, m_k]}$ intervenes in between unitary subcircuit operations $V_1(\bullet)=V_1\bullet V_1^\dagger$ and $V_2=V_2\bullet V_2^\dagger$, then the corresponding first-order contribution to M is $$-\epsilon V_2 V_1^{-1} \Lambda^{[m_1,\ldots,m_k]} V_2^{-1} = -\epsilon V_2 \Lambda^{[m_1,\ldots,m_k]} V_2^{-1} \qquad (K1)$$

and has only $4^k$ Kraus-like operators proportional to $$V_2 \sigma_{\alpha_{m_1},\ldots,\alpha_{m_k}} V_2^\dagger.$$

Since $V_2$ is a stabilizer circuit itself, $$V_2 \sigma_{\alpha_{m_1},\ldots,\alpha_{m_k}} V_2^\dagger$$

is a Pauli string, i.e., a factorized operator. Each map (K1) is a sum of $4^k$ factorized maps and can be exactly reproduced by an MPO tensor network with the bond dimension at most $4^k$. Therefore, all the first order contributions in the noise mitigation map are presented in a single MPO tensor network whose the bond dimension is at most $4^k$ times the total number of noisy k-local Pauli maps present throughout all noisy levels. For the sparse Pauli-Lindblad noise model with the nearest-neighbour cross-talk (Sec. F4), k=2 and the total number of noisy k-local Pauli maps equals (N−1)L, where N is the number of qubits and L is the circuit depth. This means that if the bond dimension $\chi_{max}>16(N-1)L$ is chosen while constructing the MPO for the noise mitigation map M, then M captures all first-order noise contributions and the possible truncation error is at most of the second order $\epsilon^2$ in the noise intensity.

FIG. 10 illustrates perturbation theory for the noise-mitigation map with respect to the noise strength: (a) the only zero-order contribution, (b) a first-order contribution, (c) a second-order contribution.

Similar arguments are applicable in all orders of the perturbation theory. For example, to find the second-order contribution to M, one needs to consider two particular maps $$\Lambda_1^{[m_1^{(1)},\ldots,m_k^{(1)}]}$$

and $$\Lambda_2^{[m_1^{(2)},\ldots,m_k^{(2)}]},$$

and fix all other noisy maps to be the identity transformations, then sum over choices for $$\Lambda_1^{[m_1^{(1)},\ldots,m_k^{(1)}]}$$

and $$\Lambda_2^{[m_1^{(2)}, \ldots, m_k^{(2)}]}$$

(see FIG. 7). Suppose $$\Lambda_1^{[m_1^{(1)}, \ldots, m_k^{(1)}]}$$

and $$\Lambda_2^{[m_1^{(2)}, \ldots, m_k^{(2)}]}$$

intervene in between three unitary subcircuit operations: $V_1(\bullet) = V_1 \bullet V_1^\dagger$, $V_2 = V_2 \bullet V_2^\dagger$, and $V_3 = V_3 \dagger V_3^\dagger$. Then the corresponding second-order contribution to M is $$\epsilon^2 V_3 V_2 V_1 V_1^{-1} \Lambda_1^{[m_1^{(1)}, \ldots, m_k^{(1)}]} V_2^{-1} \Lambda_2^{[m_1^{(2)}, \ldots, m_k^{(2)}]} V_3^{-1} = \quad (K2)$$

$$\epsilon^2 \left( V_3 V_2 \Lambda_1^{[m_1^{(1)}, \ldots, m_k^{(1)}]} V_2^{-1} V_3^{-1} \right) \left( V_3 \Lambda_2^{[m_1^{(2)}, \ldots, m_k^{(2)}]} V_3^{-1} \right)$$

and has only $4^{2k}$ Kraus-like operators proportional to $$\left( V_3 V_2 \sigma_{\alpha_{m_1^{(1)}}, \ldots, \alpha_{m_k^{(1)}}} V_2^\dagger V_3^\dagger \right) \left( V_3 \sigma_{\alpha_{m_1^{(2)}}, \ldots, \alpha_{m_k^{(2)}}} V_3^\dagger \right).$$

Since $V_3 V_2$ and $V_3$ are stabilizer circuits themselves, $$V_3 V_2 \sigma_{\alpha_{m_1^{(1)}}, \ldots, \alpha_{m_k^{(1)}}} V_2^\dagger V_3^\dagger \text{ and } V_3 \sigma_{\alpha_{m_1^{(2)}}, \ldots, \alpha_{m_k^{(2)}}} V_3^\dagger$$

are Pauli strings, and their product is again a Pauli string, i.e., a factorized operator. Each map (K2) is a sum of $4^{2k}$ factorized maps and can be exactly reproduced by an MPO tensor network with the bond dimension at most $4^{2k}$. Therefore, all the second order contributions in the noise mitigation map are presented in a single MPO tensor network whose the bond dimension is at most $4^{2k}$ times the binomial coefficient $$\binom{\#_{noisy}}{2},$$

where $\#_{noisy}$ is the total number of noisy k-local Pauli maps present throughout all noisy levels. For the sparse Pauli-Lindblad noise model with the nearest-neighbour cross-talk (Sec. 10.4), k=2 and $\#_{noisy}=(N-1)L$, where N is the number of qubits and L is the circuit depth. This means that if one exceeds the threshold bond dimension $(\chi_{max} > 16(N-1)L + 128(N-1)L [(N-1)L-1] \approx 128 N^2 L^2)$ while constructing the MPO for the noise mitigation map M, then M captures all first- and second-order noise contributions and the possible truncation error is at most of the third order $\epsilon^3$ in the noise intensity.

Using a property of binomial coefficients, $$\sum_{i=0}^{l} \binom{\#}{i} x^i \le \frac{\#-l+1}{\#-l+1-\frac{l}{x}} \binom{\#}{l} x^l,$$

and Stirling's approximation, the possible truncation error cannot exceed the order of $\epsilon^{l+1}$ if the bond dimension $\chi_{max} > 4^{lk} \#_{noisy}^l / l!$.

Conversely, for a given maximum bond dimension $\chi_{max}$ used in compression of the noise mitigation map, the compression error cannot exceed of the order $\epsilon^{\lceil l \rceil}$, where the approximate value of l is found by exploiting Stirling's approximation and an iterative method (up to the second iteration):

$$l \approx l_2 = \frac{\ln \chi + \frac{1}{2}\ln(2\pi l_1)}{\ln(4^k \#_{noisy}) + 1 - \ln l_1}, \quad l_1 = \frac{\ln \chi}{\ln(4^k \#_{noisy})}. \quad (K3)$$

For the sparse Pauli-Lindblad noise model with the nearest-neighbour cross-talk (Sec. F4), scaling of the compression error is roughly $\epsilon^{\log_{16NL}(\chi)}$. Any desired power of $\epsilon$ is achievable with the bond dimension $\chi$ polynomially scaling in the number of circuit gates (~NL).

In the foregoing, various aspects and embodiments are described. The various aspects and embodiments may be realized independent of each other, or they may be combined with each other in any possible way without departing from the scope of the present disclosure.

The invention claimed is:

1. A noise mitigation method for a noisy physical execution of a quantum circuit by a quantum processor, the method comprising:
   establishing a model of a noisy physical execution of the quantum circuit by the quantum processor, the model being representative of a noisy physical execution of a unitary operation by the quantum processor which results in a noisy final physical state of N qudits of the quantum processor, the model being represented by a quantum channel, wherein a density operator is at least an approximation of the noisy final physical state of the N qudits of the quantum processor;
   executing the noisy physical execution of the quantum circuit one or more times by the quantum processor by applying a sequence of G physical operations to the N qudits of the quantum processor to thereby obtain a set of measurement outcomes for each execution of the quantum circuit, wherein each measurement outcome comprises a physical quantum measurement applied to the noisy final physical state of the N qudits after each execution of the quantum circuit by the sequence of G physical operations;
   deriving a quasi-state tensor network representation of a quasi-state comprising an approximation of the density operator of the noisy final state based on the set of measurement outcomes of the execution of the quantum circuit and a set of dual effects corresponding to the set of measurement outcomes;
   deriving an observable tensor network representation of a Hermitian operator associated with an observable for a system of N qudits;
   deriving a noise mitigation tensor network representation of a noise mitigation map, wherein the noise mitigation map is a concatenation of an inverse of the quantum channel followed by a unitary operation, wherein each of the tensor network representations comprises respectively a plurality of quasi-state tensors, observable tensors and noise mitigation tensors;

providing the quasi-state tensor network representation, the observable tensor network representation and the noise mitigation tensor network representation to a classical computer; and executing, by the classical computer, a tensor network contraction algorithm to thereby calculate a value of the observable associated with the Hermitian operator for a final quantum state of the N qudits of the quantum circuit, the tensor network contraction algorithm including instructions for contracting a tensor network representation in terms of the quasi-state tensors, the observable tensors and the noise mitigation tensors according to a predetermined contracting rule of physical and virtual indices of the tensors to thereby obtain a noise mitigated value of an expectation value of the observable associated with the Hermitian operator for the final quantum state of the quantum circuit.

2. The method of claim 1, wherein the noisy physical execution of the unitary operation is by an application of a sequence of one or more quantum gates, each quantum gate being described by a gate unitary operation, and wherein establishing the model comprises partitioning the sequence of quantum gates in one or more subsequences of quantum gates, each of the subsequences comprising one or more quantum gates which are executed subsequently and/or simultaneously and being described by a subsequence unitary operation, wherein each subsequence of quantum gates comprises a single quantum gate or a single layer of quantum gates, and wherein establishing the model comprises establishing for each subsequence of quantum gates a subsequence model representative of the noisy physical execution of the subsequence unitary operation by the quantum processor and being described by a subsequence channel.

3. The method of claim 2, wherein establishing a respective subsequence model comprises applying quantum process tomography to the noisy implementation of the respective subsequence of quantum gates described by the subsequence unitary operation by the quantum processor to thereby determined the respective subsequence channel.

4. The method of claim 2, wherein the respective subsequence channel is modelled as the concatenation of the respective subsequence unitary operation and a noise channel representative of the noise in the execution of the respective subsequence of quantum gates by the quantum processor.

5. The method of claim 2, wherein deriving the noise mitigation tensor network representation comprises deriving a first tensor network representation of a first map comprising a plurality of first tensors, deriving for an inverse of each subsequence channel, an inverse channel tensor network representation comprising a plurality of inverse channel tensors, and deriving for each subsequence unitary operation, a subsequence tensor network representation comprising a plurality of subsequence tensors, and wherein deriving the noise mitigation tensor network representation of the noise mitigation map is by an execution of a first tensor network contraction algorithm by the classical computer, the first tensor network contraction algorithm including instructions for contracting the first tensors, inverse channel tensors and subsequence tensors according to a predetermined first contraction rule to thereby obtain the noise mitigation tensors.

6. The method of claim 5, wherein the first tensor network contraction algorithm further comprising a compression of the tensors resulting from the contraction of at least some of the first tensors, the inverse channel tensors and the subsequence tensors to thereby obtain noise mitigation tensors with a bond dimension below a predetermined threshold value.

7. The method of claim 5, wherein the first tensor network contraction algorithm comprises an iterative contraction procedure following a rule for iteratively composing the noise mitigation map from 2K maps in T steps, the rule comprising specifying an initial map $M_1$ comprising one of the 2K maps or a composition of a plurality of the 2K maps, wherein a t-th map $M_t$, $t \geq 2$, is defined according to $M_t = L_t \circ M_{t-1}$ or $M_t = M_{t-1} \circ R_t$ or $M_t = L_t \cdot M_{t-1} \circ R_t$, wherein $L_t$ and $R_t$ are one of the 2K maps or a composition of a plurality of the 2K maps such that $M_T$ is equal to the noise mitigation map, and wherein the iterative contraction procedure comprises a step of deriving a tensor network representation of $M_1$ comprising the subsequence and/or inverse channel tensors of the 2K maps whose composition results in $M_1$, and T−1 iterative steps, wherein in the t-th iterative step, t=1, . . . , T−1, a (t+1)-th tensor network representation of $M_{t+1}$ is derived by contracting the tensor network representations of M, and the tensor network representation of respective ones of $R_{t+1}$ and $L_{t+1}$ according to a (t+1)-th contraction rule to thereby obtain a plurality of (t+1)-th tensors of the (t+1)-th tensor network representation.

8. The method of claim 7, wherein for at least one iterative step, the first tensor network contraction algorithm comprises instruction for compressing the (t+1)-th tensors such that their bond dimension is below a predetermined threshold value.

9. The method of claim 8, wherein compressing the tensors comprises an execution of a truncation algorithms or an application of a variational algorithm.

10. The method of claim 7, wherein the tensor network representation of $M_{t+1}$ is derived by contracting the tensor network representation of $M_t$ according to the (t+1)-th contraction rule.

11. The method of claim 1, wherein at least one tensor network representation comprises at least one tensor associated with each qudit, and a single tensor associated with each qudit, wherein the tensor $B^{[k]}$ associated with the k-th qudit has at least one physical index and at least one virtual index.

12. The method of claim 1, wherein for at least one operator or map Q, the respective tensor network representation is a matrix product operator representation, $Q = \sum_{a_0, \ldots, a_{N-2}}^{\chi-1} A_{a_0}^{[0]} \otimes A_{a_0 a_1}^{[1]} \otimes \ldots \otimes A_{a_{N-3} a_{N-2}}^{[N-2]} \otimes A_{a_{N-2}}^{[N-1]}$, wherein for any values of the virtual indicies $a_{k-1}$, $a_k$ the map $A_{a_{k-1} a_k}^{[k]}$ is acting on the k-th qudit, the map $A_{a_0}^{[0]}$ is acting on the 0-th qubit and the map $A_{a_{N-2}}^{[N-1]}$ is acting on the (N−1)-th qubit, and wherein $\chi$ is the bond dimension.

13. The method of claim 1, wherein for at least one operator or map, the operator or map of the respective tensor network representation is a projected entangled pair operator representation or a tree tensor network representation.

14. The method of claim 1, wherein the effects are L-producible, $L \geq 1$, i.e., each effect is a tensor product of operators each of which is acting on at most L qudits, i.e., $\Pi_{m(k_0, \ldots, k_{N-1})} = \Pi_{k_0}^{(0)} \otimes \Pi_{k_1}^{(1)} \otimes \ldots \otimes \Pi_{k_{r-1}}^{(r-1)}$, wherein $\Pi_{k_n}^{(n)}$ acts on at most L qudits.

15. The method of claim 1, wherein deriving at least one of the tensor network representations is at least partially carried out by an algorithm executed by the classical computer.

16. A computing system comprising a quantum processor and a classical computer, the computing system being configured to establish a model of a noisy physical execution of a quantum circuit by the quantum processor, the model being representative of a noisy physical execution of a unitary operation U by the quantum processor which results in a noisy final physical state of N qudits of the quantum processor, the model being represented by a quantum channel, wherein a density operator is at least an approximation of the noisy final physical state of the N qudits of the quantum processor;

execute the noisy physical execution of the quantum circuit one or more times by the quantum processor by applying a sequence of G physical operations to the N qudits of the quantum processor to thereby obtain a set of measurement outcomes for each execution of the quantum circuit, wherein each measurement outcome comprises a physical quantum measurement applied to the noisy final physical state of the N qudits after each execution of the quantum circuit by the sequence of G physical operations;

derive a quasi-state tensor network representation of a quasi-state comprising an approximation of the density operator of the noisy final state based on the set of measurement outcomes of the execution of the quantum circuit and a set of dual effects corresponding to the set of measurement outcomes;

derive an observable tensor network representation of a Hermitian operator which is associated with an observable for a system of N qudits;

derive a noise mitigation tensor network representation of a noise mitigation map, wherein the noise mitigation map is a concatenation of an inverse of the quantum channel followed by a unitary operation, wherein each of the tensor network representations comprises respectively a plurality of quasi-state tensors, observable tensors and noise mitigation tensors;

provide the quasi-state tensor network representation, the observable tensor network representation and the noise mitigation tensor network representation to a classical computer; and execute, by the classical computer, a tensor network contraction algorithm to thereby calculate a value of the observable associated with the Hermitian operator for a final quantum state of the N qudits of the quantum circuit, the tensor network contraction algorithm including instructions for contracting a tensor network representation of in terms of the quasi-state tensors, the observable tensors and the noise mitigation tensors according to a predetermined contracting rule of physical and virtual indices of the tensors to thereby obtain a noise mitigated value of an expectation value of the observable associated with the Hermitian operator for the final quantum state of the quantum circuit.

17. A non-transitory computer program product including instructions which, when the program is carried out by a computer system comprising a classical computer and a quantum processor, cause the computer system to:

establish a model of a noisy physical execution of a quantum circuit by the quantum processor, the model being representative of a noisy physical execution of a unitary operation by the quantum processor which results in a noisy physical final state of N qudits of the quantum processor, the model being represented by a quantum channel, wherein a density operator is at least an approximation of the noisy final physical state of the N qudits of the quantum processor;

execute the noisy physical execution of the quantum circuit one or more times by the quantum processor by applying a sequence of G physical operations to the N qudits of the quantum processor to thereby obtain a set of measurement outcomes for each execution of the quantum circuit, wherein each measurement outcome comprises a physical quantum measurement applied to the noisy final physical state of the N qudits after each execution of the quantum circuit by the sequence of G physical operations;

derive a quasi-state tensor network representation of a quasi-state comprising an approximation of the density operator of the noisy final state based on the set of measurement outcomes of the execution of the quantum circuit and a set of dual effects corresponding to the set of measurement outcomes;

derive an observable tensor network representation of a Hermitian operator which is associated with an observable for a system of N qudits;

derive a noise mitigation tensor network representation of a noise mitigation map, wherein the noise mitigation map is a concatenation of an inverse of the quantum channel $\varepsilon$ followed by a unitary operation, wherein each of the tensor network representations comprises respectively a plurality of quasi-state tensors, observable tensors and noise mitigation tensors;

provide the quasi-state tensor network representation, the observable tensor network representation and the noise mitigation tensor network representation to a classical computer; and execute, by the classical computer, a tensor network contraction algorithm to thereby calculate a value of the observable associated with the Hermitian operator for a final quantum state of the N qudits of the quantum circuit, the tensor network contraction algorithm including instructions for contracting a tensor network representation in terms of the quasi-state tensors, the observable tensors and the noise mitigation tensors according to a predetermined contracting rule of physical and virtual indices of the tensors to thereby obtain a noise mitigated value of an expectation value of the observable associated with the Hermitian operator for the final quantum state of the quantum circuit.

18. The computing system of claim 16, wherein:

the noisy physical execution of the unitary operation is by an application of a sequence of one or more quantum gates, each quantum gate being described by a gate unitary operation, and wherein establishing the model comprises partitioning the sequence of quantum gates in one or more subsequences of quantum gates, each of the subsequences comprising one or more quantum gates which are executed subsequently and/or simultaneously and being described by a subsequence unitary operation, wherein each subsequence of quantum gates comprises a single quantum gate or a single layer of quantum gates, and wherein establishing the model comprises establishing for each subsequence of quantum gates a subsequence model representative of the noisy physical execution of the subsequence unitary operation by the quantum processor and being described by a subsequence channel; and deriving the noise mitigation tensor network representation comprises deriving a first tensor network representation of a first map comprising a plurality of first tensors, deriving for the inverse of each subsequence channel, an inverse channel tensor network representation comprising a plurality of inverse channel tensors, and deriving for each subsequence unitary operation, a subsequence tensor network representation comprising a plurality of subsequence tensors, and wherein deriving the noise mitigation tensor network representation of the noise mitigation map is by an execution of a first tensor network contraction algorithm by the classical computer, the first tensor network contraction algorithm including instructions for contracting the first tensors, inverse channel tensors and subsequence tensors according to a predetermined first contraction rule to thereby obtain the noise mitigation tensors.

19. The computing system of claim 18, wherein the first tensor network contraction algorithm comprises an iterative contraction procedure following a rule for iteratively composing the noise mitigation map from 2K maps in T steps, the rule comprising specifying an initial map $M_1$ comprising one of the 2K maps or a composition of a plurality of the 2K maps, wherein a t-th map $M_t$, t≥2, is defined according to $M_t = L_t \circ M_{t-1}$ or $M_t = M_{t-1} \circ R_t$, or $M_t = L_t \circ M_{t-1} \circ R_t$, wherein Lt and Rt are one of the 2K maps or a composition of a plurality of the 2K maps such that $M_T$ is equal to the noise mitigation map, and wherein the iterative contraction procedure comprises a step of deriving a tensor network representation of $M_1$ comprising the subsequence and/or inverse channel tensors of the 2K maps whose composition results in $M_1$, and T−1 iterative steps, wherein in the t-th iterative step, t=1, . . . , T−1, a (t+1)-th tensor network representation of $M_{t+1}$ is derived by contracting the tensor network representations of M, and the tensor network representation of respective ones of $R_{t+1}$ and $L_{t+1}$ according to a (t+1)-th contraction rule to thereby obtain a plurality of (t+1)-th tensors of the (t+1)-th tensor network representation.

20. The computing system of claim 19, wherein the tensor network representation of $M_{t+1}$ is derived by contracting the tensor network representation of Mt according to the (t+1)-th contraction rule.

21. The computer program product of claim 17, wherein:
the noisy physical execution of the unitary operation is by an application of a sequence of one or more quantum gates, each quantum gate being described by a gate unitary operation, and wherein establishing the model comprises partitioning the sequence of quantum gates in one or more subsequences of quantum gates, each of the subsequences comprising one or more quantum gates which are executed subsequently and/or simultaneously and being described by a subsequence unitary operation, wherein each subsequence of quantum gates comprises a single quantum gate or a single layer of quantum gates, and wherein establishing the model comprises establishing for each subsequence of quantum gates a subsequence model representative of the noisy physical execution of the subsequence unitary operation by the quantum processor and being described by a subsequence channel; and deriving the noise mitigation tensor network representation comprises deriving a first tensor network representation of a first map comprising a plurality of first tensors, deriving for the inverse of each subsequence channel, an inverse channel tensor network representation comprising a plurality of inverse channel tensors, and deriving for each subsequence unitary operation, a subsequence tensor network representation comprising a plurality of subsequence tensors, and wherein deriving the noise mitigation tensor network representation of the noise mitigation map is by an execution of a first tensor network contraction algorithm by the classical computer, the first tensor network contraction algorithm including instructions for contracting the first tensors, inverse channel tensors and subsequence tensors according to a predetermined first contraction rule to thereby obtain the noise mitigation tensors.

22. The computing program product of claim 21, wherein the first tensor network contraction algorithm comprises an iterative contraction procedure following a rule for iteratively composing the noise mitigation map from 2K maps in T steps, the rule comprising specifying an initial map $M_1$ comprising one of the 2K maps or a composition of a plurality of the 2K maps, wherein a t-th map $M_t$, t≥2, is defined according to $M_t = L_t \circ M_{t-1}$ or $M_t = M_{t-1} \circ R_t$ or $M_t = L_t \circ M_{t-1} \circ R_t$, wherein $L_t$ and $R_t$ are one of the 2K maps or a composition of a plurality of the 2K maps such that M is equal to the noise mitigation map, and wherein the iterative contraction procedure comprises a step of deriving a tensor network representation of $M_1$ comprising the subsequence and/or inverse channel tensors of the maps whose composition results in $M_1$, and T−1 iterative steps, wherein in the t-th iterative step, t=1, . . . , T−1, a (t+1)-th tensor network representation of $M_{t+1}$ is derived by contracting the tensor network representations of Mt and the tensor network representation of respective ones of $R_{t+1}$ and $L_{t+1}$ according to a (t+1)-th contraction rule to thereby obtain a plurality of (t+1)-th tensors of the (t+1)-th tensor network representation.

23. The computing program product of claim 22, wherein the tensor network representation of $M_{t+1}$ is derived by contracting the tensor network representation of $M_t$ according to the (t+1)-th contraction rule.

* * * * *